(12) United States Patent
Fowler et al.

(10) Patent No.: US 12,492,025 B2
(45) Date of Patent: Dec. 9, 2025

(54) PACKAGING

(71) Applicant: Rockit Global Limited, Hamilton (NZ)

(72) Inventors: Andrew Vernon Fowler, Hamilton (NZ); Ryan Douglas Tasma, Saltillo, MS (US); Shane Timothy Daly, Hamilton (NZ)

(73) Assignee: Rockit Global Limited, Hamilton (NZ)

( * ) Notice: Subject to any disclaimer, the term of this patent is extended or adjusted under 35 U.S.C. 154(b) by 264 days.

(21) Appl. No.: 17/995,015

(22) PCT Filed: Apr. 6, 2021

(86) PCT No.: PCT/NZ2021/050058
§ 371 (c)(1),
(2) Date: Sep. 29, 2022

(87) PCT Pub. No.: WO2021/201702
PCT Pub. Date: Oct. 7, 2021

(65) Prior Publication Data
US 2023/0219703 A1 Jul. 13, 2023

(30) Foreign Application Priority Data
Apr. 2, 2020 (NZ) ........................... 763219

(51) Int. Cl.
*B65B 5/10* (2006.01)
*B25J 9/00* (2006.01)
(Continued)

(52) U.S. Cl.
CPC ............. *B65B 5/105* (2013.01); *B25J 9/0093* (2013.01); *B25J 11/0045* (2013.01);
(Continued)

(58) Field of Classification Search
CPC . B25J 9/0093; B25J 9/02; B25J 9/1602; B25J 9/1612; B25J 11/0045;
(Continued)

(56) References Cited

U.S. PATENT DOCUMENTS 4,532,752 A 8/1985 Taylor et al.
10,086,519 B2 * 10/2018 Wagner .................. B65G 47/91
(Continued)

FOREIGN PATENT DOCUMENTS

JP H11301610 A * 11/1999
JP 2004307051 A * 11/2004
(Continued)

OTHER PUBLICATIONS

Galley, Alexandre, George K. Knopf, and Mohamed Kashkoush. "Pneumatic hyperelastic actuators for grasping curved organic objects." Actuators. vol. 8. No. 4. MDPI, 2019.*
(Continued)

*Primary Examiner* — Jason Holloway
*Assistant Examiner* — Blake A Wood
(74) *Attorney, Agent, or Firm* — Knobbe, Martens, Olson & Bear, LLP

(57) ABSTRACT

An end effector adapted to be carried by a robot positioning apparatus for packing items of produce, the end effector adapted in use for holding an open topped elongate container (tube) in an inverted orientation, wherein the tube has a closed bottom end and an open top end; the end effector comprising: at least one actuatable movable element located on the end effector so as to be adjacent the open end of a tube held by the end effector; wherein the actuatable movable element is configured to be operable between: an extended position which at least partially extends over the open end of a tube held by the end effector to at least partially obstruct the open end of the tube; and a retracted position so that the
(Continued)

open end of the container is substantially unobstructed to allow items of produce to be received in the tube.

31 Claims, 18 Drawing Sheets

(51) Int. Cl.
*B25J 11/00* (2006.01)
*B65B 25/04* (2006.01)
*B65B 35/08* (2006.01)
*B65B 43/46* (2006.01)
*B65B 57/12* (2006.01)

(52) U.S. Cl.
CPC .............. *B65B 25/04* (2013.01); *B65B 35/08* (2013.01); *B65B 43/46* (2013.01); *B65B 57/12* (2013.01)

(58) Field of Classification Search
CPC ............ B25J 15/0014; B25J 15/0019; B25J 15/0033; B25J 15/0095; B25J 15/0408; B25J 18/04; B65B 5/105; B65B 25/04; B65B 25/046; B65B 35/08; B65B 35/24; B65B 35/58; B65B 43/46; B65B 57/12; B65B 85/34; B65G 47/24; B65G 27/295; B65G 27/90; B65G 47/902; B65G 47/91

See application file for complete search history.

(56) References Cited

U.S. PATENT DOCUMENTS

| | | | |
|---|---|---|---|
| 2010/0148529 A1* | 6/2010 | Maffeis | B65G 47/908 |
| | | | 294/199 |
| 2014/0363266 A1* | 12/2014 | Cooper | B65B 5/105 |
| | | | 414/790.2 |
| 2018/0007871 A1 | 1/2018 | Elferink et al. | |
| 2018/0281202 A1 | 10/2018 | Brudniok et al. | |
| 2018/0297727 A1* | 10/2018 | Hartley | B65D 43/0231 |

FOREIGN PATENT DOCUMENTS

| | | |
|---|---|---|
| JP | 2017006826 A | 1/2017 |
| WO | WO 2017119982 A1 | 6/2017 |
| WO | WO 2017182974 A1 | 10/2017 |
| WO | WO 2016175665 A1 | 11/2018 |

OTHER PUBLICATIONS

English Machine Translation of JPH11301610A, Accessed Jul. 3, 2025.*

English Machine Translation of JP2004307051, Accessed Jul. 3, 2025.*

* cited by examiner

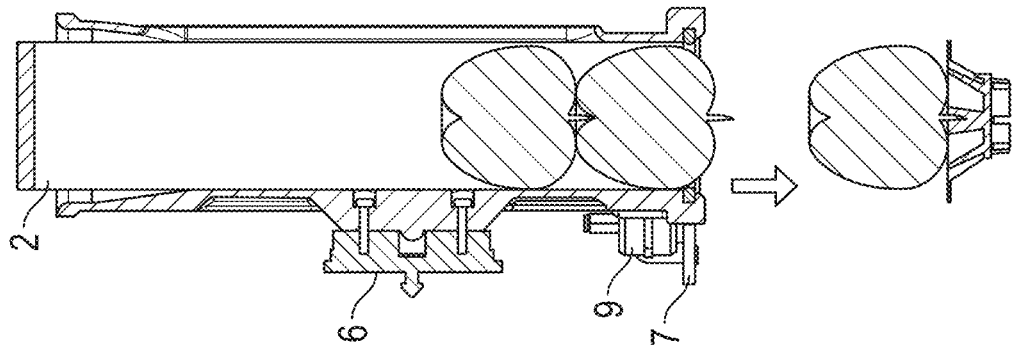
FIGURE 10
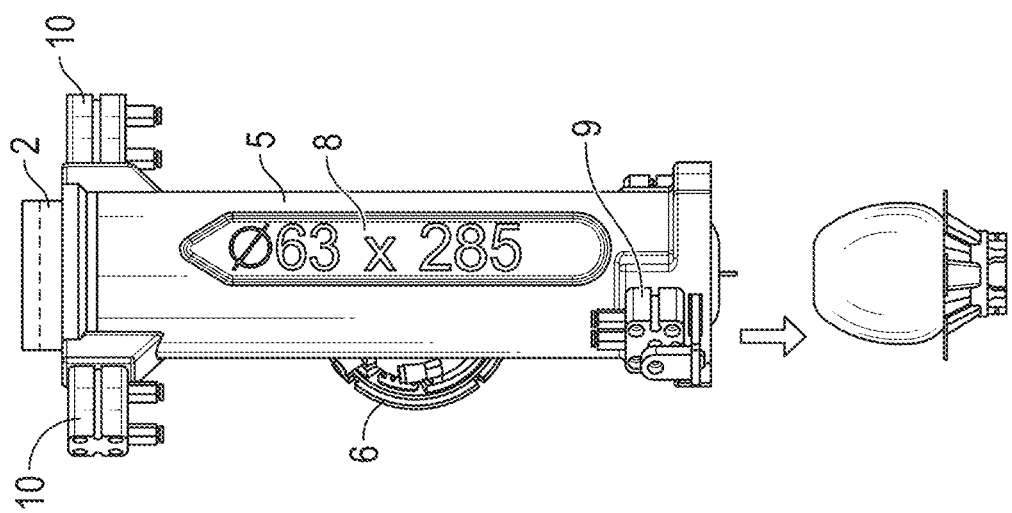
FIGURE 9
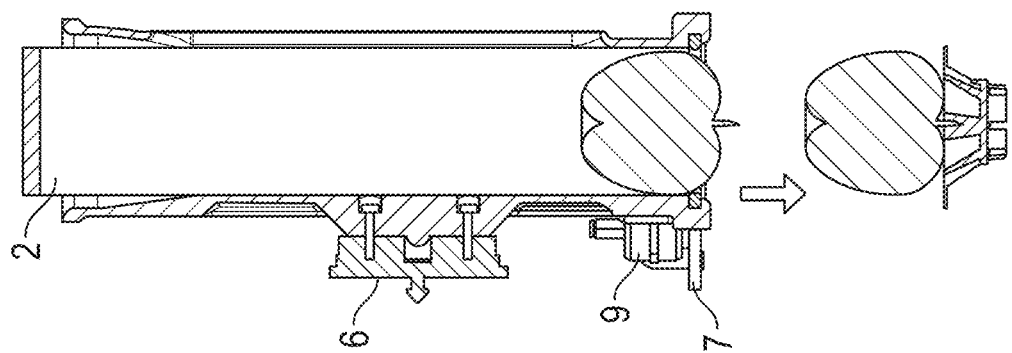

PACKAGING

STATEMENT OF CORRESPONDING APPLICATIONS

This application is based on the Provisional specification filed in relation to New Zealand Patent Application Number 763219, the entire contents of which are incorporated herein by reference.

TECHNICAL FIELD

The invention relates to an apparatus for packaging objects in a tube, and in particular, for packing fruit or other perishable/food items in a tube.

BACKGROUND ART

Apples and other items of fruit are traditionally packaged in boxes. To minimise damage to fruit, typically fruit is supported in a tray within a box to keep fruit separated from adjacent fruit. A single box may include one or more layers of fruit, with each layer supported by a tray.

The applicant introduced a novel approach to packaging fruit (apples), by packing apples in a tube rather than in trays in a box. Each tube typically contains two or more items of fruit, for example five apples.

The tube may be cylindrical in shape or may have over shapes in cross section, for example square, triangular or other shape. An inner dimension of the tube is commensurate with an outer dimension of the fruit so that when full, the tube contains a single row or column of fruit. For example, in a cylindrical tube, an inner diameter of the tube is preferably slightly larger than a maximum expected diameter of the fruit. The expected maximum diameter of fruit may be based on a known distribution of fruit size for a particular variety and/or type of fruit.

Packing fruit in a tube can introduce inefficiencies in the packing process. Each item of fruit cannot be dropped into the tube, since physical impacts between fruit as each item of fruit is dropped into the tube can cause damage to the fruit during packing (bruising). Also, unlike packing fruit in a box, each item of fruit must be added to the tube one at a time. This packing process can be time consuming and therefore can add cost to the packing process.

It is an object of the present invention to address one or more of the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

DISCLOSURE OF THE INVENTION

According to one aspect of the present invention there is provided an end effector adapted to be carried by a robot positioning apparatus for packing items of produce, the end effector adapted in use for holding an open topped elongate container (tube) in an inverted orientation, wherein the tube has a closed bottom end and an open top end; the end effector comprising:
  at least one actuatable movable element located on the end effector so as to be adjacent the open end of a tube held by the end effector;
  wherein the actuatable movable element is configured to be operable between:
    an extended position which at least partially extends over the open end of a tube held by the end effector to at least partially obstruct the open end of the tube; and
    a retracted position so that the open end of the container is substantially unobstructed to allow items of produce to be received in the tube.

According to a second aspect of the present invention there is provided an end effector wherein the end effector comprises a frame for receiving the tube.

According to a third aspect of the present invention there is provided an end effector wherein the actuatable moveable element is located adjacent one end of the frame.

According to a fourth aspect of the present invention there is provided an end effector wherein the actuatable movable element is made from a soft resilient material and is elastically deformable between a first shape when in the extended position and a second shape when in the retracted position.

According to a fifth aspect of the present invention there is provided an end effector wherein the first shape is circular.

According to a sixth aspect of the present invention there is provided an end effector substantially as described above, wherein the second shape is non-circular or approximately oval.

According to a seventh aspect of the present invention there is provided an end effector substantially as described above wherein the actuatable movable element is substantially ring shape or has a substantially ring-shaped central portion.

According to an eighth aspect of the present invention there is provided an end effector wherein the actuatable movable element comprises a first part and a second part, the first and second parts each comprising an arcuate portion and a lateral member extending from each end of the arcuate portion, the first and second parts diametrically opposed with the lateral members of the first part in contact with or adjacent the lateral members of the second part.

According to a ninth aspect of the present invention there is provided an end effector wherein in the retracted position a gap is provided between a proximal or radially inward portion of the lateral members of the first and second parts, and in the extended position the arcuate portions are elastically deformed and the proximal ends of the lateral members of the first and second parts are moved together to close the gap.

According to a $10^{th}$ aspect of the present invention there is provided an end effector wherein the end effector includes:
  a holding arrangement configured to:
    grip the tube and secure the tube to the end effector; and
  wherein the holding arrangement grips the tube adjacent the closed bottom end of the tube.

Preferably, the holding arrangement deforms the cross-sectional shape of the tube so as to assist with frictional securement of the position of items of produce within the tube during a packing operation.

According to an $11^{th}$ aspect of the present invention there is provided an end effector wherein the holding arrangement comprises at least one movable component movable between a disengaged position and an engaged position, in the disengaged position the component(s) is/are out of contact with the tube and in the engaged position the movable component(s) is/are in contact with the tube to squeeze and deform the tube.

According to a $12^{th}$ aspect of the present invention there is provided an end effector wherein the robot positioning apparatus provides at least four degrees of freedom to move the end effector along x, y and z axes with respect to items of produce to be packaged and rotate the end effector about a horizontal axis between inverted and up-right orientations.

According to a $13^{th}$ aspect of the present invention there is provided a produce packaging device wherein the device comprises a controller programmed to:
i) control a positioning apparatus to position the end effector in an inverted orientation in x and y directions vertically above a first item of produce to be packaged; and move the end effector vertically downwards to receive the first item of produce in the tube within the end effector, and
ii) if required actuate the actuatable movable element from the retracted position to the extended position to retain the first item of fruit in the tube, then once within the tube actuate the actuatable moveable element to the retracted position to retain the first item of fruit within the tube, and
iii) control the positioning apparatus to move the end effector vertically upwards.

Preferably the positioning apparatus may be in the form of a robot.

However, it is envisaged other positioning apparatus capable of moving the end effector in a 3-dimensional space, may be employed, in the present invention.

According to a $14^{th}$ aspect of the present invention there is provided a produce packaging device substantially as described above, wherein the controller is further programmed to:
iv) control the positioning apparatus to move the end effector in the x and y directions to position the end effector vertically above a further item of fruit, and move the end effector vertically downwards to position next item of fruit adjacent or in contact with the further item of fruit;
v) actuate the actuatable movable element from the retracted position to the extended position;
vi) control the positioning apparatus to continue to move the end effector vertically downwards to receive the further item of produce in the tube within the end effector;
vii) actuate the actuatable movable element from the retracted position to the extended position to retain the first item of fruit and further item of fruit in the tube; and
viii) control the positioning apparatus to move the end effector vertically upwards; and
ix) repeat steps iv) to viii) until the tube is full.

According to a $15^{th}$ aspect of the present invention there is provided a produce packaging device substantially as described above, wherein the controller is further programmed to:
x) when the tube is full control the robot positioning apparatus to rotate the end effector from the inverted orientation to an upright orientation to position an open end of the tube uppermost, and move the end effector to a release area to release the tube from the end effector.

According to a $16^{th}$ aspect of the present invention there is provided a produce packaging device substantially as described above, wherein the controller is further programmed to control the robot positioning apparatus to move the end effector vertically upwards to release the tube from the end effector.

According to a $17^{th}$ aspect of the present invention there is provided a produce packaging device substantially as described above in the $10^{th}$ aspect, wherein the controller is further programmed to:
actuate the holding arrangement to an engaged position to grip and deform the cross-sectional shape of the tube near to a closed end of the tube so that the first item of produce is obstructed from entering a space at the closed end of the tube.

According to a $18^{th}$ aspect of the present invention there is provided a produce packaging device substantially as described above, wherein the controller is further programmed to:
control the robot positioning apparatus to rotate the end effector from the inverted orientation to an upright orientation to position an open end of the tube uppermost, and move the end effector to a release area; and
actuate the holding arrangement to a disengaged position to release the tube.

According to a $19^{th}$ aspect of the present invention there is provided a produce packaging device substantially as described above, wherein the device comprises a singulation unit to space apart the items of produce and present singulated items, or grouped items, of product to a reach envelope for the robot positioning apparatus.

According to a $20^{th}$ aspect of the present invention there is provided a produce packaging device substantially as described above, wherein the singulation unit spaces the items/groups of produce apart in a 2-dimensional array.

According to a $21^{st}$ aspect of the present invention there is provided a produce packaging device substantially as described above, wherein the singulation unit comprises a conveyor configured to present the items/groups of produce in a manner which conforms with the reach envelope of the robot positioning apparatus.

According to a $22^{nd}$ aspect of the present invention there is provided a produce packaging device substantially as described above, wherein in step i) the controller is programmed to control the robot positioning apparatus to move the end effector vertically above an item of produce and move in a conveying direction at a speed of the conveyor so that the end effector remains vertically above the item of produce.

According to a $23^{rd}$ aspect of the present invention there is provided a produce packaging device substantially as described above, wherein the conveyor comprises a continuous loop carrying a plurality of spaced apart holders, each holder adapted to hold an individual item of produce.

According to a $24^{th}$ aspect of the present invention there is provided a produce packaging device substantially as described above, wherein the holders are spaced apart in a conveying direction and orthogonal to the conveying direction to present the items of produce in a 2-dimensional array.

According to a $25^{th}$ aspect of the present invention there is provided a produce packaging device substantially as described above, wherein the device further comprises a sensing arrangement in communication with the controller to sense or detect a datapoint for each item of produce, the controller programmed to:
store in a memory a datapoint for each item of produce associated with a respective holder of the singulation unit holding the item of produce, control the robot positioning apparatus and end effector to pack each item of produce based on the datapoint for each item of produce According to a 26th aspect of the present invention there is provided a produce packaging device substantially as described above, wherein the holder is formed from a resilient soft material.

According to a 27th aspect of the present invention there is provided a produce packaging device substantially as described above, wherein each holder is configured as a cup comprising a side wall extending from a base, wherein an upper end of the wall presents a rim for receiving an item of produce.

According to a 28th aspect of the present invention there is provided a produce packaging device substantially as described above, wherein the wall is castellated to have inner wall portions and outer wall portions.

According to a 29th aspect of the present invention there is provided a produce packaging device substantially as described above, wherein the holder comprises tabs extending radially outwards from and spaced apart around the rim, and wherein when the end effector is moved downwards to receive an item of fruit in the tube, an end of the end effector contacts the tabs.

According to a 30th aspect of the present invention there is provided a produce packaging device substantially as described above, wherein each holder is a unitary member.

According to a 31st aspect of the present invention there is provided a produce packaging device for packing items of produce, the device comprising a conveying apparatus with at least one continuous loop arrangement and a plurality of spaced apart holders attached to the continuous loop arrangement, each holder adapted to support an individual item of produce, the holders spaced apart in longitudinal and lateral directions of the conveying apparatus so that the items of produce are arranged in discrete locations in a 2D array.

According to a 32nd aspect of the present invention there is provided an actuatable movable element wherein the actuatable movable element is made from a soft resilient material.

According to a 33rd aspect of the present invention there is provided an actuatable movable element substantially as described above wherein the actuatable movable element is elastically deformable between a first shape when in the retracted position and a second shape when in the extended position.

According to a 34th aspect of the present invention there is provided an actuatable movable element substantially as described above wherein the first shape is circular.

According to a 35th aspect of the present invention there is provided an actuatable movable element substantially as described above, wherein the second shape is non-circular or approximately oval.

According to a 36th aspect of the present invention there is provided an actuatable movable element comprises a substantially ring shaped central portion with two laterally extending opposed arms located along a medial axis of the ring shaped central portion.

According to a 37th aspect of the present invention there is provided an actuatable movable element comprises a substantially ring shaped central portion with two laterally extending opposed arms located along a medial axis of the ring shaped central portion, wherein the central ring shaped portion is comprised of two halves, each half created along a medial axis of the central ring shaped portion which is orthogonal to the medial axis along which the laterally extending opposed rings are located.

According to a 38th aspect of the present invention there is provided an actuatable movable element comprises a first part and a second part, the first and second parts each comprising an arcuate portion and a lateral member extending from each end of the arcuate portion, the first and second parts diametrically opposed with the lateral members of the first part in contact with or adjacent the lateral members of the second part.

According to a 39th aspect of the present invention there is provided a holder for supporting produce in transit for packaging, the holder comprising:
  at least partially conical, at least partially tapered, or at least partially semi-circular, wall(s)—when viewed in cross-section; and
  at least one substantially horizontally outwardly projecting tab on the top rim of said conical or semi-circular wall(s);
wherein said holder is manufactured from a soft resilient material.

According to a 40th aspect of the present invention there is provided a holder substantially as described above wherein there are six horizontally projecting tabs.

According to a 41st aspect of the present invention there is provided a holder substantially as described above wherein the at least partially conical, at least partially tapered, or at least partially semi-circular, wall(s) are truncated.

According to a 42nd aspect of the present invention there is provided a holder substantially as described above wherein the bottom of said wall(s) are connected to a base.

According to a 43rd aspect of the present invention there is provided a holder substantially as described above wherein the base is substantially ring-shaped when viewed from above/below.

According to a 44th aspect of the present invention there is provided a holder substantially as described above wherein the at least partially tapered, or at least partially semi-circular, wall(s) are castellated to have inner wall portions and outer walls portions connected by webs.

According to a 45th aspect of the present invention there is provided the use of a robotic positioning apparatus (rpa) to dimensionally position a container for receipt of articles to be packaged.

Preferably, said articles are items of produce.

Preferably, the said rpa also moves the container to insert therein said article to be packaged.

Preferably, the said rpa further controls an end effector to enable entry of said article to be packaged into said container.

Preferably, the said rpa further controls an end effector to retain therein said article to be packaged.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

Definitions

Hereinafter, the term 'robot' is to be understood as meaning manipulators or industrial robots which have one or more joints, which in particular can perform translatory and/or rotational movements, such that one or more end-effectors of a robot have different positions (spatial positions or positions). Translational and/or rotational movements may include, movements along one or more rails on which parts/arms (links) of the robot are guided. Even such rails thus form joints in the sense of a kinematic chain, which describes the possibility of movement of a robot. The term 'robot' as used herein may be understood to mean an apparatus comprising a Cartesian robot/gantry robot, SCARA robot/horizontal articulated robot, cylindrical robot/cylinder coordinate robot, spherical robot/spherical coordinate robot, articulated robot. Generally, the term 'robot' or 'robot positioning apparatus' as used herein may be understood to mean an apparatus configured to move with at least four degrees of freedom, including three translational degrees of freedom and at least one rotational degree of freedom.

The term 'soft' as used herein refers to the ability of a material to yield to physical pressure.

The term 'resilient' as used herein refers to the ability of a material to return to its original shape after being deformed due to an applied force.

BRIEF DESCRIPTION OF THE DRAWINGS

Further aspects of the present invention will become apparent from the ensuing description which is given by way of example only and with reference to the accompanying drawings in which:

FIG. 9 shows a longitudinal cross-sectional view and a side view of the end effector of FIG. 1 retaining an apple within the tubular container and with the end effector positioned above a second apple to be received within the tubular container held by the end effector when moved in the direction of the arrow shown;

FIG. 10 shows a longitudinal cross-sectional view and a side view of the end effector of FIG. 1 retaining two apples within the tubular package and with the retaining device positioned above a third apple to be received within the tubular container held by the end effector when the end effector is moved in the direction of the arrow shown;

BEST MODES FOR CARRYING OUT THE INVENTION

FIGS. 1 to 7 illustrate an end effector 1 for holding an open topped elongate container or tube 2 in an inverted orientation for packaging items such as fruit or vegetables, including apples and tomatoes and other items of produce (herein referred to produce or items of produce).

Figure 7:
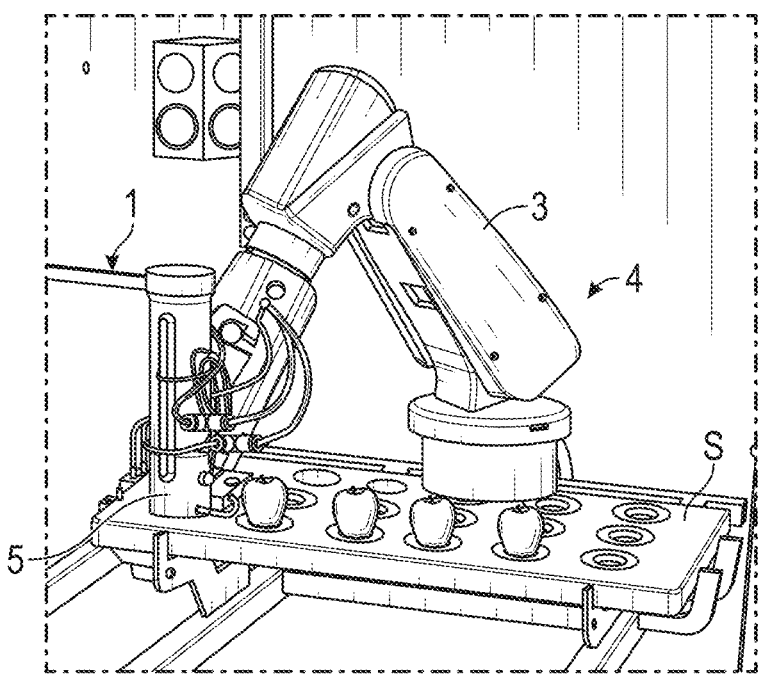
FIG. 7 shows a robotic arm and end effector forming part of a packaging assembly.

The end effector 1 is adapted to be attached to the end of a robot positioning apparatus as shown in FIG. 7.

As can be seen in FIG. 7 there is shown part of a packing assembly 4 comprising at least one a positioning apparatus in the form of an articulated robotic arm 3 and associated end effector 1.

The articulated robotic arm 3 being capable of moving the end effector in a 3-dimensional space.

Figure 1:
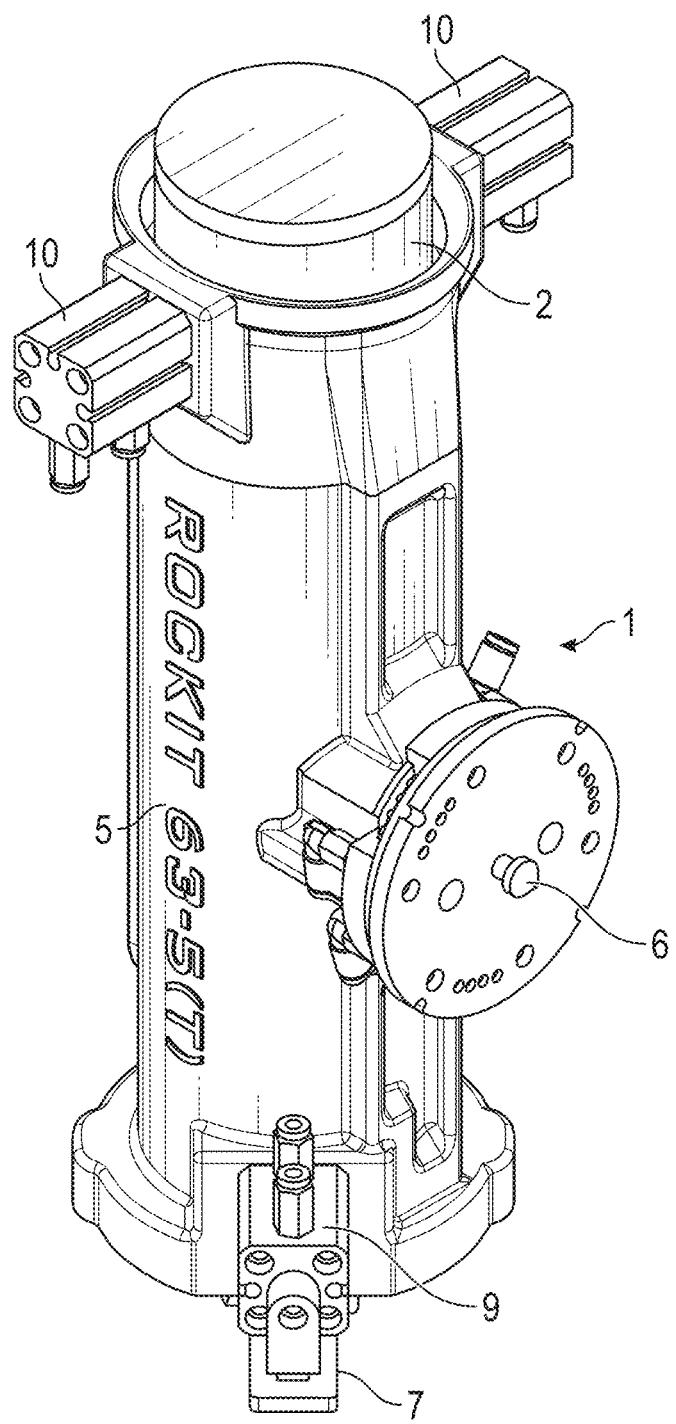
FIG. 1 shows an end effector for holding a tubular container in an inverted orientation. The retaining device is configured as an end effector to be coupled to a robotic arm.
Figure 2:
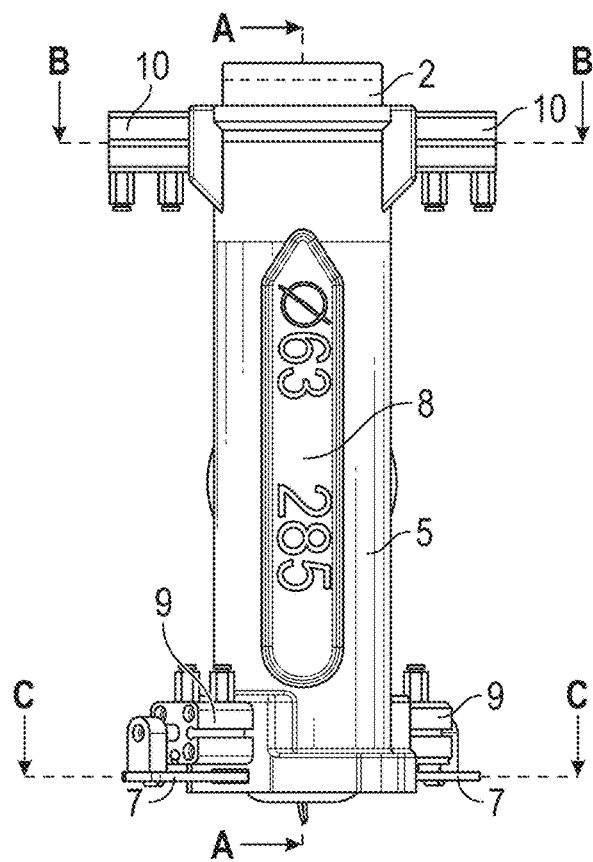
FIG. 2 shows a side view of the retaining device of FIG. 1.
Figure 3:
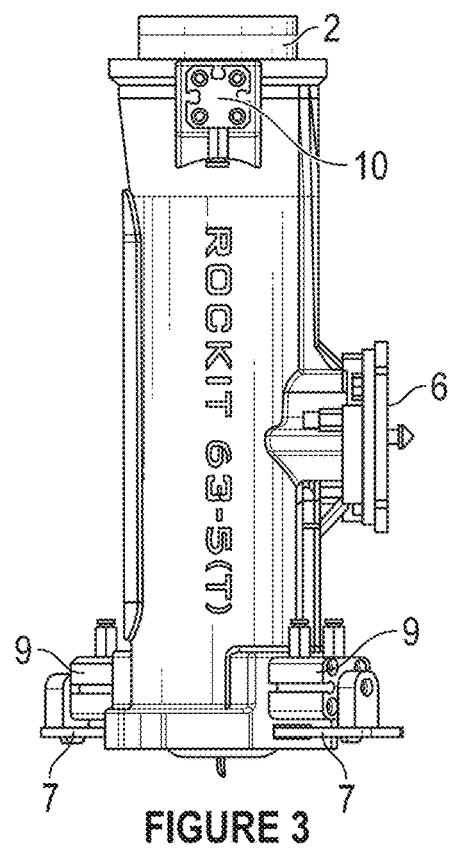
FIG. 3 shows a further side view of the end effector of FIG. 1, viewed at 90 degrees to the view of FIG. 2.

Referring back, to FIGS. 1-6 the end effector 1 comprises a frame 5 for receiving the tubular container 2. The frame 5 is preferably open at both ends. The frame 5 of the illustrated embodiment is configured as a barrel. The barrel is substantially closed on longitudinal sides. The illustrated end effector 1 includes a longitudinal window 8 on one side, as shown in FIG. 2.

The frame may be otherwise configured, for example as a cage formed by a series of longitudinal members held together by one or two or more lateral rings.

A coupling 6 is provided to an outside of the frame 5 to attach the end effector to a robot positioning apparatus. The coupling is preferably a quick release coupling and may be a known standard coupling.

Figure 4:
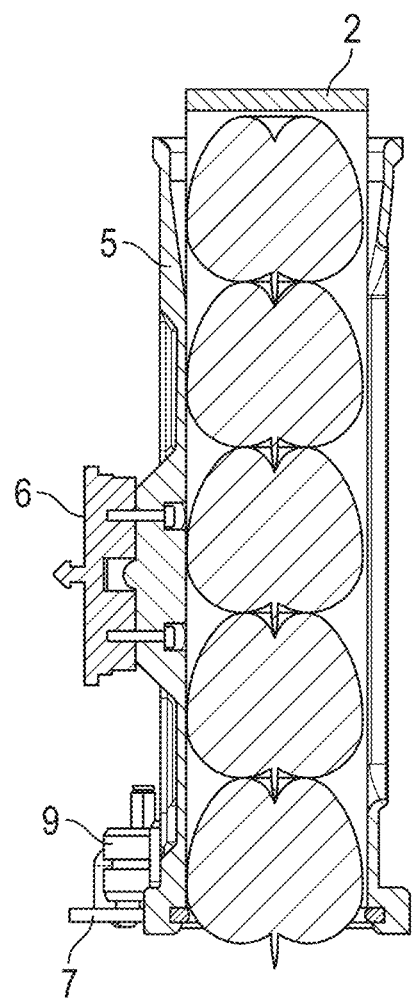
FIG. 4 shows a longitudinal cross-sectional view along line A-A shown in FIG. 2.

The frame 5 presents a bore to receive the tubular container 2. The bore has an inner dimension (e.g., diameter) slightly larger than an outer lateral dimension (diameter) of the tubular container. As can be seen In FIG. 2 when the frame 5 is arranged vertically, the container 2 can also be maintained therein in an upright configuration, with a longitudinal axis A-A of the container substantially vertical (for example as shown in FIG. 4).

Figure 5:
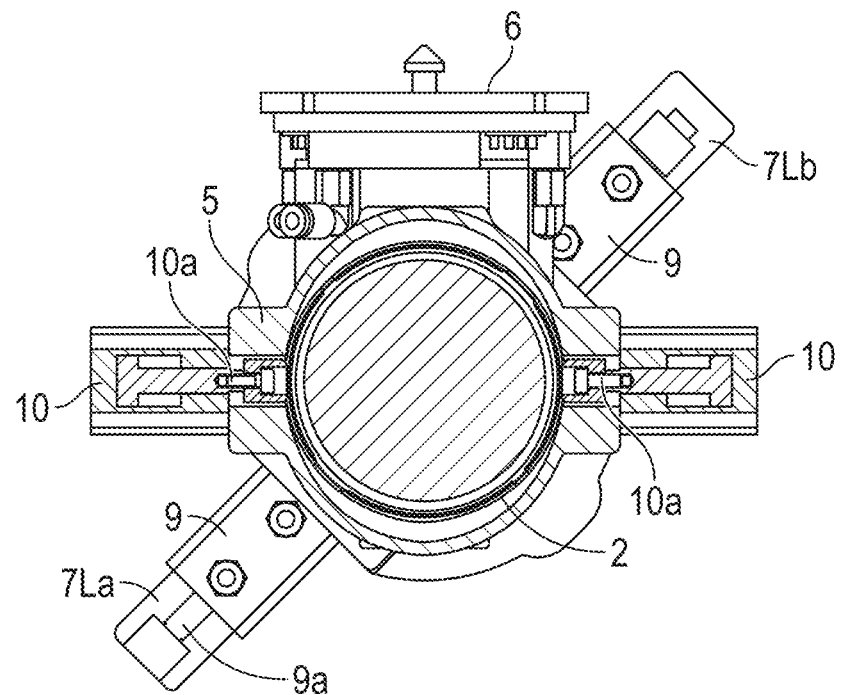
FIG. 5 shows a lateral cross-sectional view along line B-B shown in FIG. 2.

As shown in FIG. 5, the holding arrangement includes diametrically opposed movable components in the form of a pair of rams 10a actuatable between extended positions and retracted positions via pneumatic cylinders 10.

In the disengaged position the rams 10a are each out of contact with opposed sides of the tube 2. In the engaged position the rams 10a are moved to engage the opposed sides of the tube and deform its cross-sectional shape by squeezing together. The holding arrangement deforming the cross-sectional shape of the tubular container 2 near to or adjacent the closed end of the tube 2 can assist with a frictional securement of the relative position of fruit within the tubular container during a packing operation when more fruit are being introduced to the tube.

An alternate holding arrangement may include a single movable component 9 adapted to engage and squeeze the tubular container, for example against a side of the frame opposite the moveable component 9.

The end effector 1 also has at least one actuatable moveable element 7 adjacent one end of the frame. With the tubular container received in the frame, the actuatable movable element is located on the end effector 1 so as to be adjacent the open-end of the tubular container 2.

Figure 6:
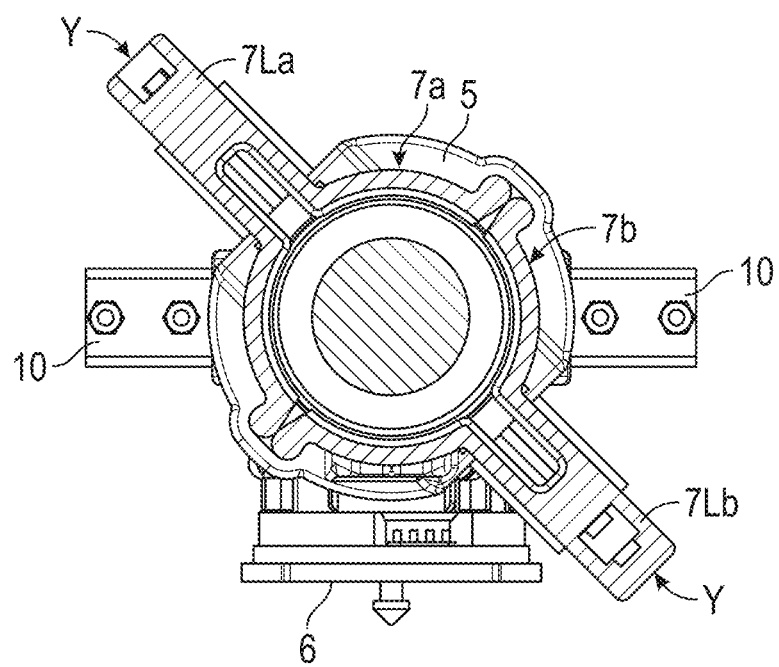
FIG. 6 shows a lateral cross-sectional view along line C-C shown in FIG. 2.

The actuatable moveable element 7 has two opposed parts 7a, 7b made from a soft resilient material—refer FIG. 6.

As can be seen each part 7a, 7b has an arcuate central section with a lateral members 7La, 7Lb extending from the convex side thereof radially outward.

The parts 7a, 7b are diametrically opposed and are shown in the extended (open) position wherein the arcuate central sections form a substantially circular shape (ring-shape).

The ring-shape is substantially the same circumference or slightly larger than that of the tube. Thus, in this extended position the end effector 1 enables the tube to receive an apple or other item of produce.

Figure 8:
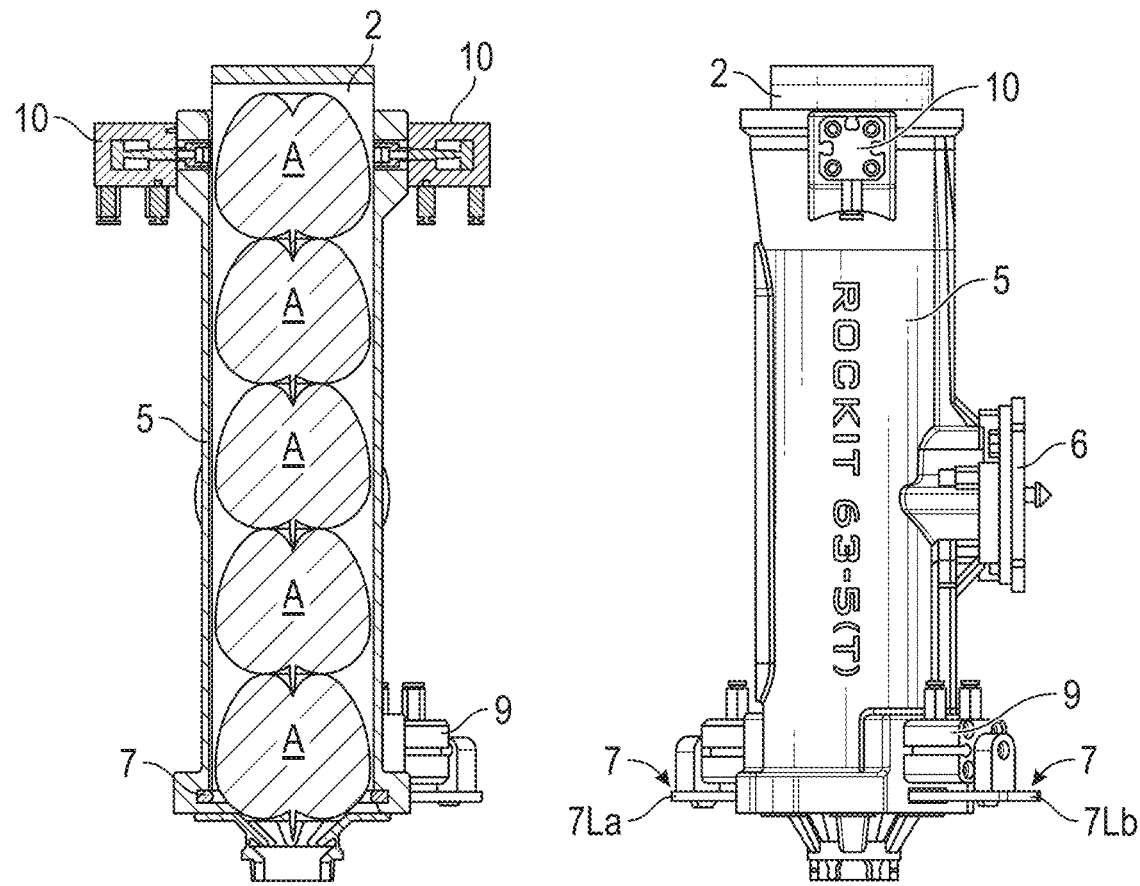
FIG. 8 shows a longitudinal cross-sectional view and a side view of the end effector of FIG. 1 receiving an apple within a tubular package held by the retaining device.

The actuatable moveable element 7 and parts 7a,7b are moved:
between the extended (open) position shown in FIG. 6 and a retracted (closed) position shown viewed side on in FIG. 8;
by pneumatic cylinders 9 and associated rams 9a.

In the extended position the proximal ends of the lateral members 7La, 7Lb are moved towards one another by retracting rams 9a in directions shown by arrows Y in FIG. 6.

This retraction of the rams 9a has the effect of deforming the ring-shape formed by central arcuate sections of parts 7a, 7b into an oval shape which, due to its narrower dimensions, extends over the opening of the tube 2 to retain an apple therein.

Figure 11:
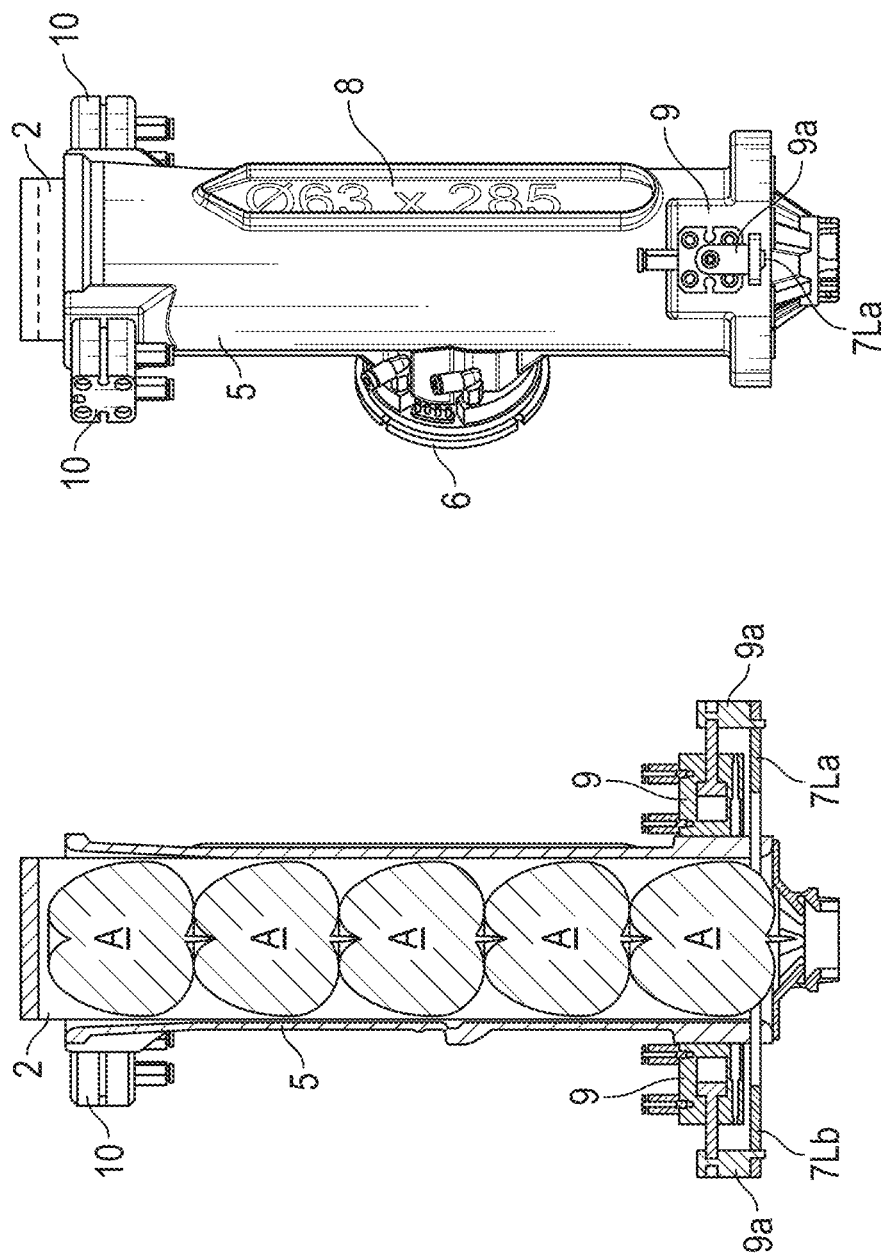
FIG. 11 shows a longitudinal cross-sectional view and a side view of the end effector of FIG. 1 with the tubular package held within the retaining device full of apples.

FIGS. 8 and 11 show the actuatable movable element 7 in the retracted (closed) position. In the closed position, the element 7 extends at least partially over the end of the tube 2 to an extent that can retain an item of fruit within the tube 2 when the inverted tube is lifted with the open top of the tube 2 facing downwards.

Thus, in the retracted position the actuatable movable element 7 prevents an item of produce such as an apple from passing through the open end of the tubular container 2.

It should be appreciated that in some embodiments the actuatable element 7 may move between the retracted and extended positions without deformation.

The lateral members of parts 7a, 7b are received in a recess in a side wall of the frame 5 as shown in FIG. 11.

As mentioned preferably the actuatable movable element 7 is formed from a soft resilient material. For example, the actuatable movable element is formed from a polyhydroxybutyrate-co-valerate (PHBV) biopolymer such as manufactured and sold by TianAn Biologic Materials Co., Ltd under the trade mark ENMAT. The material is chosen to provide a relatively soft and resilient contact with the surface of the fruit to avoid or reduce the risk of damage to the fruit.

Packing Operation

A packing operation is described with reference to FIGS. 8 to 14. The packing operation is performed with the end effector 1 attached to a robotic arm 3 or other robot positioning apparatus (not shown).

The robot positioning apparatus 3 provides at least four degrees of freedom of movement, so that the robot positioning apparatus is adapted to move the end effector in x, y and z translational directions to position the end effector in a 3-dimensional space, and including at least one rotational direction (e.g. roll) to allow the end effector to rotated about a horizontal axis to be inverted. The x direction may be a horizontal direction, the y direction may be a horizontal direction orthogonal to the x direction, and the z direction vertical.

At the beginning of a packing operation a tubular container 2 is received in the end effector 1.

For example, a robotic arm 3 or other robot positioning apparatus may move the end effector 1 to a tube dispenser (not shown) to receive a tube from the upper end or the lower end of the frame 5.

Alternatively, a person may insert or place a tubular container into the frame 5.

The tubular container 2 is received in the frame 5 of the end effector 1 with the closed (bottom) end of the tubular container uppermost, i.e., the container is held by the robot positioning apparatus in an inverted orientation with the open top of the container facing downwards.

The robot positioning apparatus moves the inverted tube 2 in the end effector 1/frame 5 in a 3-dimensional space to an item of produce such as an apple A supported on a supporting surface.

The robot positioning apparatus orients the end effector 1/frame 5 and therefore the tubular container 2 vertically and positions the frame 5 directly above the item of produce A. With the open end of the tubular container 2 positioned directly above the item of produce A, the robot positioning apparatus 3 lowers the end effector 1 over the item of produce A to receive the produce in the open end of the tubular container 2, as shown in FIG. 8.

Once the item of produce A is received in the tubular container 2, the actuatable movable element 7 is actuated to the retracted position to capture and retain the item of produce A in the tubular container 2 within the end effector.

The robot positioning apparatus then lifts the end effector 1 to pick up the fruit off the supporting surface S (shown in FIG. 7) and moves the end effector to position the end effector 1 directly above a second or further item of produce, as shown in FIG. 9.

The end effector 1 picks up the second item of produce by lowering the end effector 1 onto the second item of produce. As the end effector is lowered to a height of the second item of produce, the actuatable movable element 7 is moved to the extended (closed) position once the first item of produce is in contact with or adjacent the second item of produce to prevent the first item of produce from dropping from the frame 5 of the end effector 1.

The robot positioning apparatus 3 continues to lower the end effector 1 until the second item of produce is received in the tubular container 2—see FIG. 10. As the second item of produce enters the tubular container 2 the second item of produce displaces the first item of produce further into the container 2.

Once the second item of produce is received in the tubular container 2 the actuatable moveable member 7 is actuatable to the retracted position to retain the second and first items of produce in the tubular container 2. The robot positioning apparatus 3 then lifts and moves the end effector 1 down to pick up a further item of produce.

The robot positioning apparatus with end effector 1 continues to pick up further items of produce in this manner until the tubular container is full, as shown in FIG. 11.

The tubular container 2 receives five apples A when full, as shown in FIG. 11.

FIG. 11 shows the actuatable moveable element 7 in the retracted position to retain the lower most apple and therefore all apples within the tubular container 2.

Figure 12:
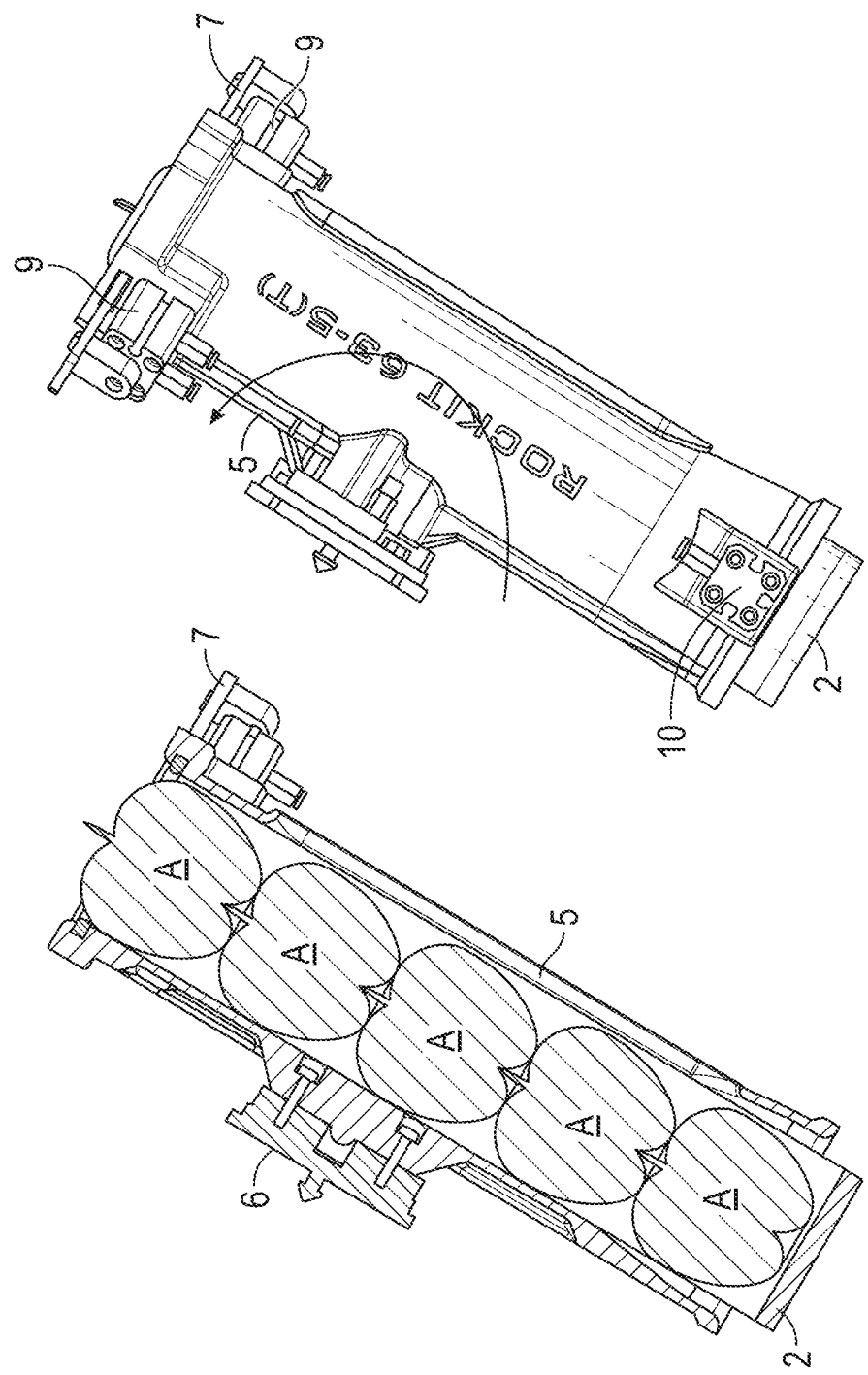
FIG. 12 shows the end effector of FIG. 1 as shown on the left hand side being rotated as indicated by the arrow to orientate an open top of the tubular package uppermost as shown on the right hand side.
Figure 13:
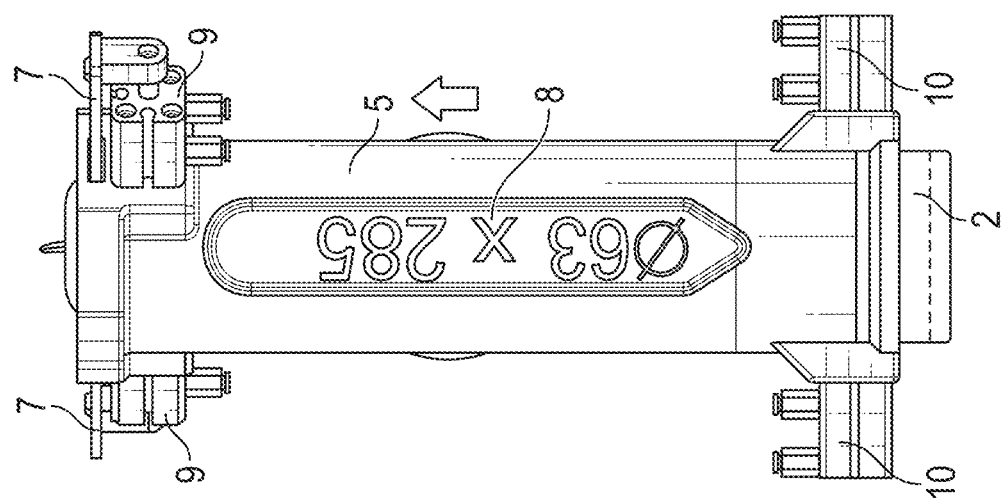
FIG. 13 shows a longitudinal cross-sectional view and a side view of the end effector of FIG. 1 with the full tubular package oriented with its open top positioned uppermost ready for the retaining device to release the full package.
Figure 13:
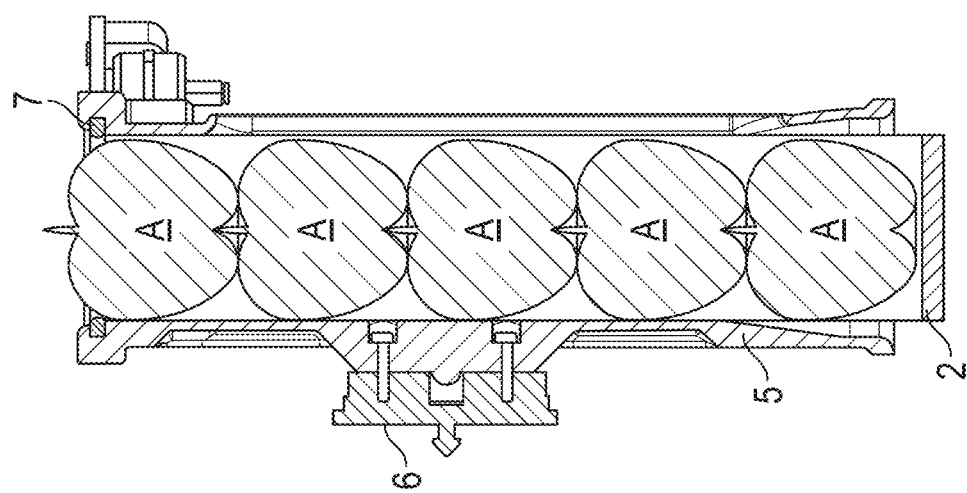

The robot positioning apparatus 3 with end effector 1 then lifts a last item of produce from the supporting surface S and the robot positioning apparatus 3 rotates the end effector 1 as indicated by the arrow in FIG. 12 to position the open top of the tubular container uppermost as shown in FIG. 13.

Preferably, the end effector 1 has a holding arrangement configured to grip the inverted tubular container as described above.

During the process the holding arrangement 10 continues to deform the cross-sectional shape of the tubular container 2 near to the closed end of the tubular container 2. This helps ensure that the items of produce A do not substantially fall or move along the tubular container 2 into a space at the end of the container. As the tubular container is righted from the inverted orientation with the open top facing downwards to the right-way-up orientation with the open top uppermost.

The holding arrangement via pneumatic cylinders 10 and rams 10*a* pinches the tubular container 2 slightly so that the items of produce A are substantially retained between the holding arrangement 10 and the actuatable moveable element 9—during rotation the pinching helps with:

making sure the upper most item of produce in the tube is obstructed/restricted from entering a space at the closed end of the tube to prevent potential damage to said item of produce—i.e. the risk of items of produce being damaged/bruised when rotating the end effector from the inverted orientation to the upright orientation.

Furthermore, this pinching may prevent the produce from rolling or moving along the tubular package and becoming misaligned within the tubular container as the end effector is rotated, i.e., a desired orientation of the items of produce can be maintained.

For example, items of produce such as apples may be presented on a surface to the end effector with a stem of the fruit facing downwards. The holding arrangement 10 ensures the fruit are presented stem up in the tubular container. Other orientations may be desirable, for example to present a blush on fruit towards a display window of the tubular container.

The robot positioning apparatus 3 moves the end effector 1 to a release area to release the tubular container from the end effector.

Once the tubular container 2 is the right-way-up, the holding arrangement 10 is actuatable to the disengaged position to release the tube 2 from its pinched configuration and allow the produce to be dropped controllably to rest on the closed bottom of the tubular container 2.

The robot positioning apparatus 3 then—as a result of disengaging the holding arrangement 10—lifts the end effector 1 off the tubular container 2 as indicated by the arrow shown in FIG. 13.

Figure 14:
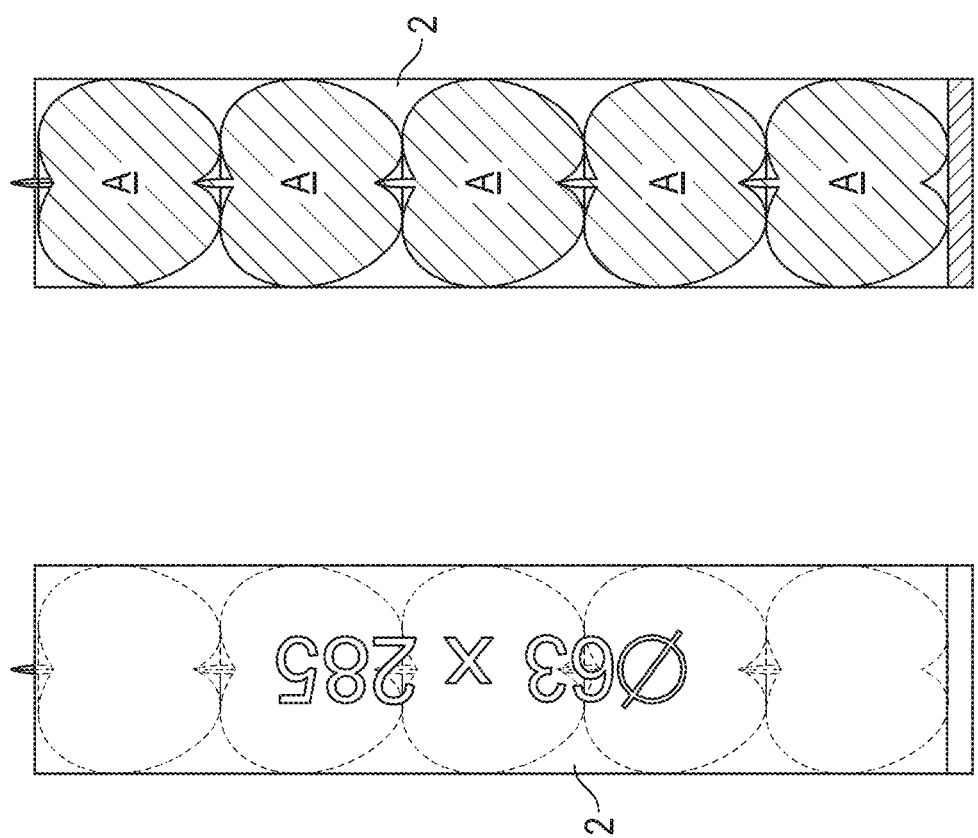
FIG. 14 shows a longitudinal cross-sectional view and a side view of the full tubular package when full.

FIG. 14 shows the tubular container 2 full of apples. A lid may be applied to the open top of the container to complete the packing operation.

One skilled in the art will understand that a controller (for example a Programmable Logic Controller (PLC)) is provided to control movement of the robot positioning apparatus 3 and actuation of the rams 9*a*, 10*a*. Control lines are provided from a power source to the actuators 9, 10, for example pneumatic lines from a pressurized pneumatic supply controlled by control valves in turn controlled by the controller.

The controller may be internal or external to the robot positioning apparatus.

Figure 15:
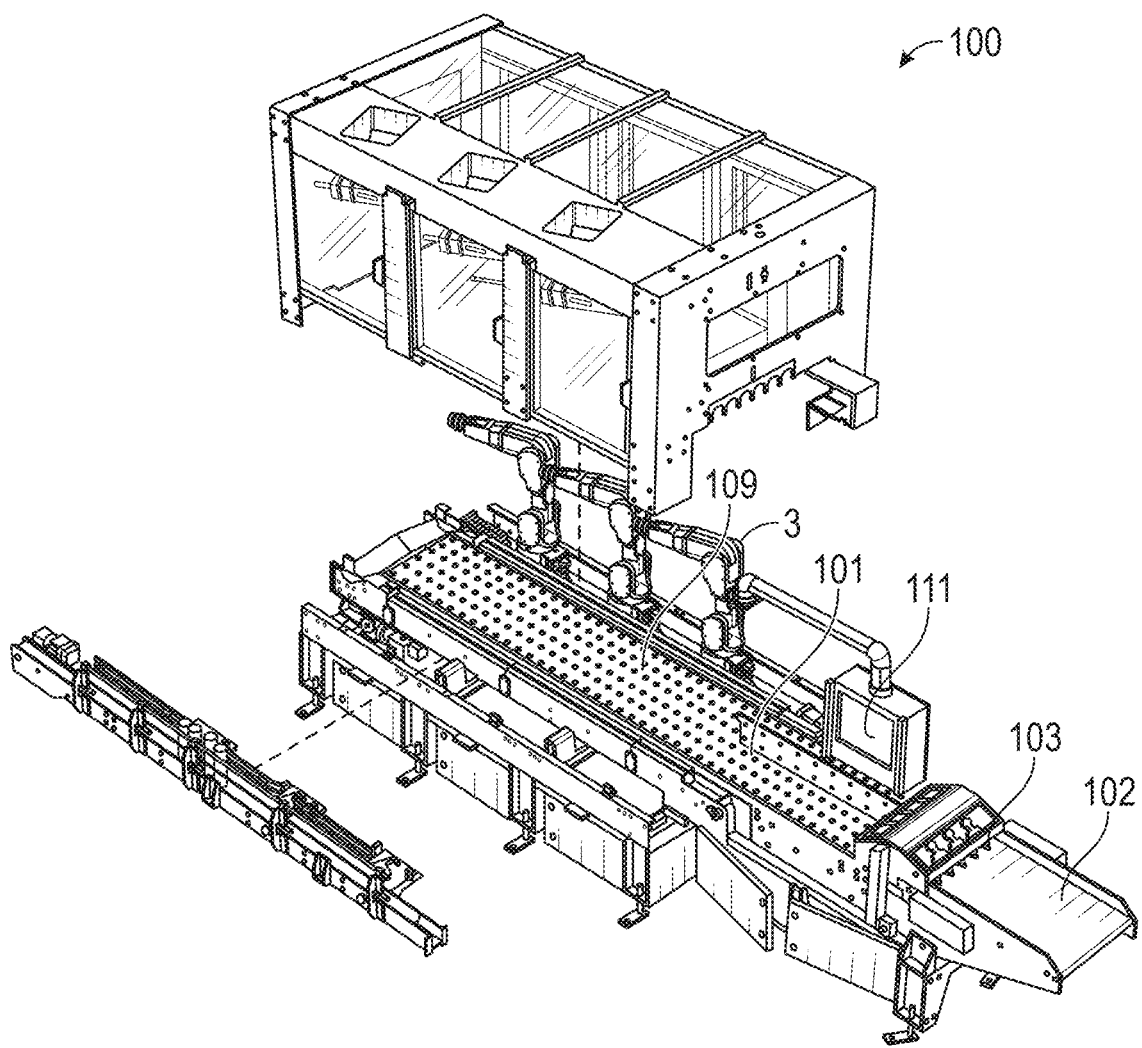
FIG. 15 is a partly exploded view of a produce packing device or system in accordance with a preferred embodiment of a further aspect of the present invention.

FIG. 15 provides a partly exploded view of a produce packing device or system 100. The produce packing device comprises at least one robot positioning apparatus 3 and end effector 1 as described above (not illustrated in FIG. 15), and a singulation unit 101 for singulation of produce provided to the produce packing device 4.

The singulation unit 101 separates the produce (not shown) to space the produce apart in at least a line or row.

In the illustrated embodiment the singulation unit separates the produce to space the produce apart in two dimensions, i.e., spaced apart in a two-dimensional array. The items of produce are spaced apart in x and y directions—as shown by apertures 150 in conveyor belt 151.

The singulated produce is presented to a reach envelope (region of reach) for each of the at least one robot positioning apparatus 3 with end effector 1, so that produce can be packed in a tubular package retained in the end effector 1 as described above.

The produce is sufficiently spaced apart on the conveying surface so that the end effector 1 can be lowered over an individual item of produce without contacting adjacent items of produce.

Figure 16:
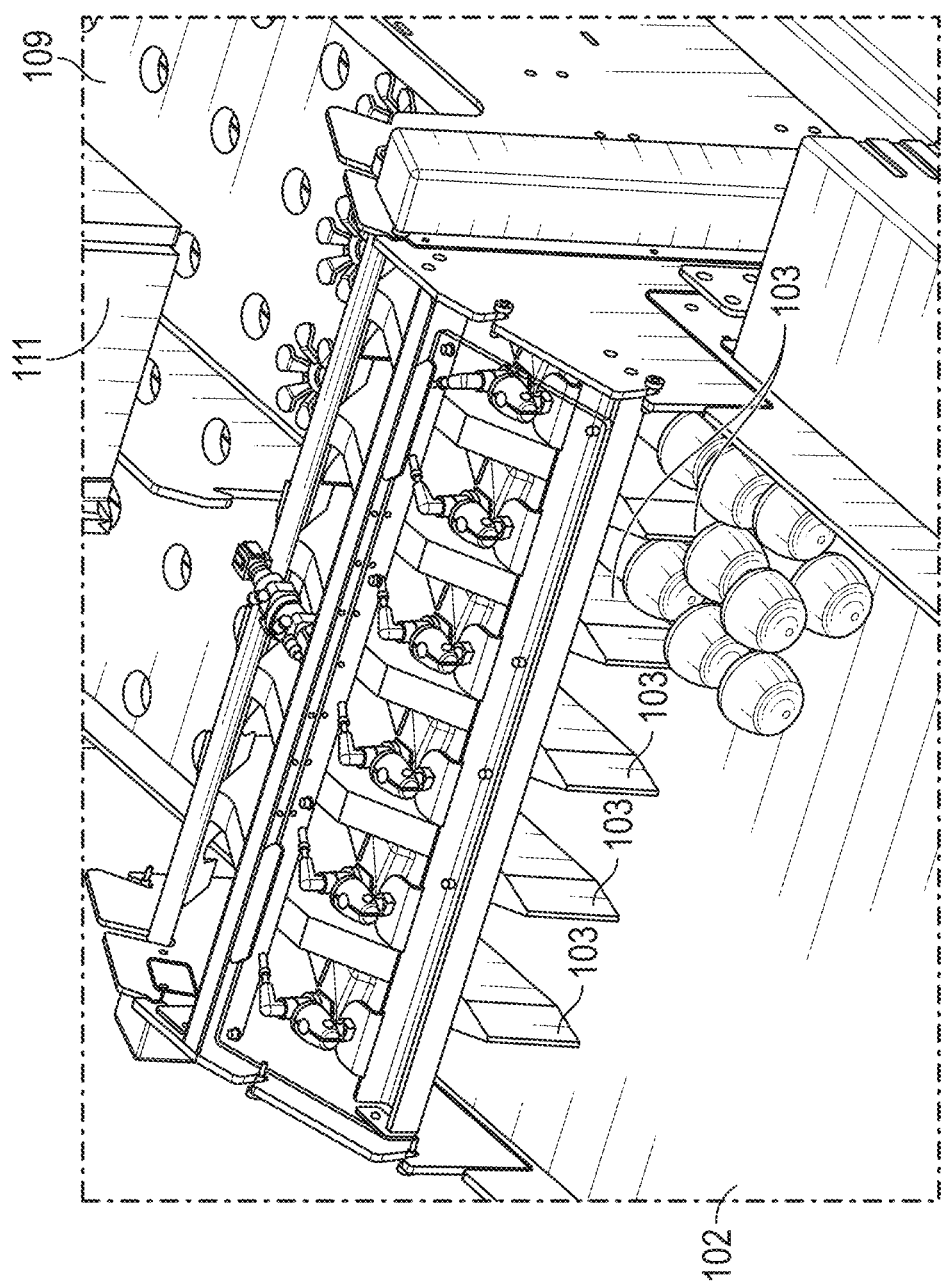
FIGS. 16 to 21 illustrates a singulation operation performed by a singulation unit of the produce packing device of FIG. 15.

FIGS. 15 to 22 illustrate a singulation operation performed by the singulation unit 101. As shown in FIG. 16, produce (apples in the illustrated example) are provided to the singulation unit from an infeed conveyor 102.

The infeed conveyor 102 conveys the produce towards lane barriers 103 to separate the produce into at least one column or lane of produce, and preferably a plurality of adjacent lanes of produce as shown.

The infeed conveyor 102 may comprise one or more conveying apparatuses to move the produce in a conveying direction. In the illustrated embodiment the infeed conveyor is a conveyor belt.

The produce continues to be conveyed on the infeed conveyor 102 along the lane(s) soon to be defined by the lane dividers 103 towards a separating device 104 (which encompasses lane dividers 103 and a moveable stop block 105) (FIG. 17) to space apart the items of produce in a longitudinal or conveying direction (a y direction) of the singulation unit 101.

Figure 17:
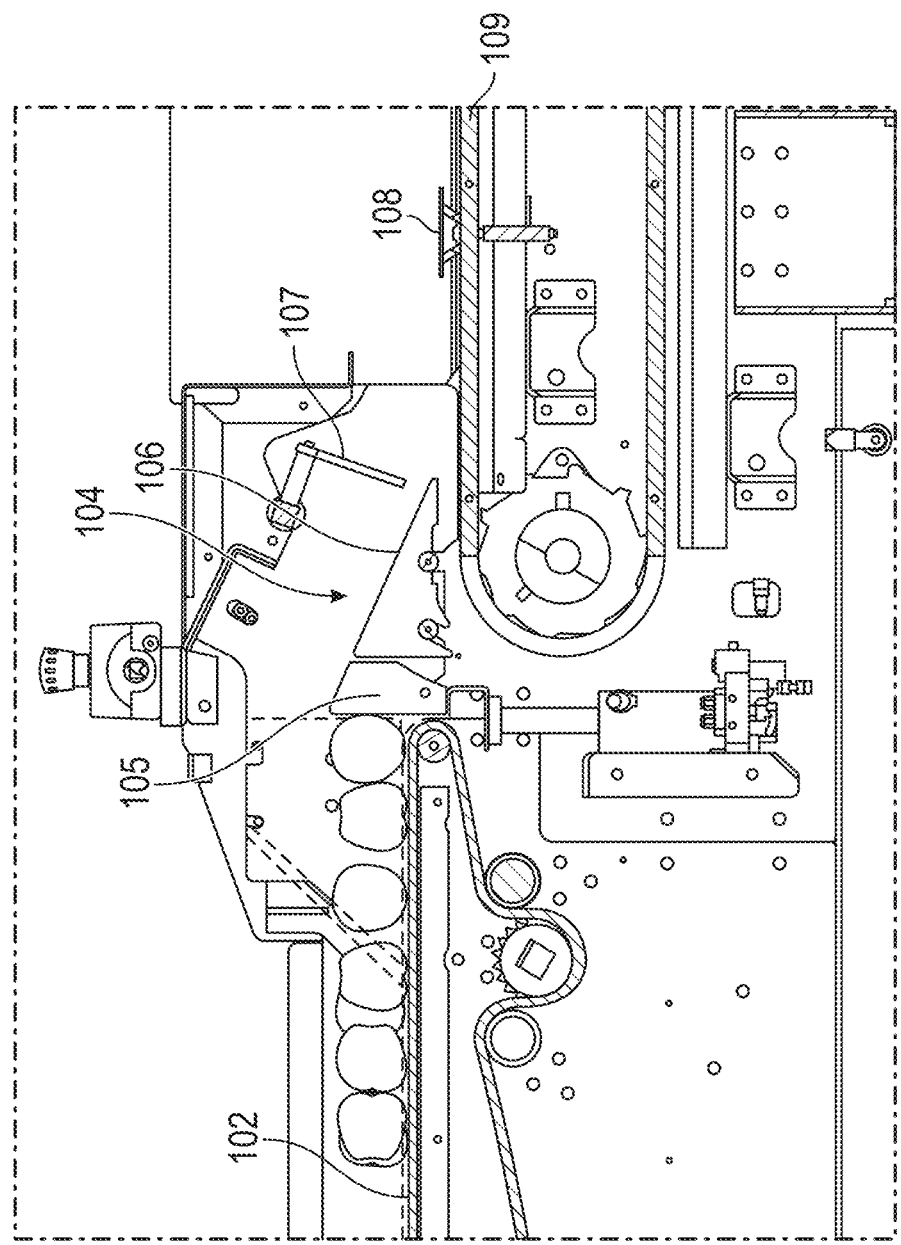

The items of produce continue along the lanes defined by the lane dividers 103 until they reach the stop block 105, as shown in FIG. 17.

Figure 18:
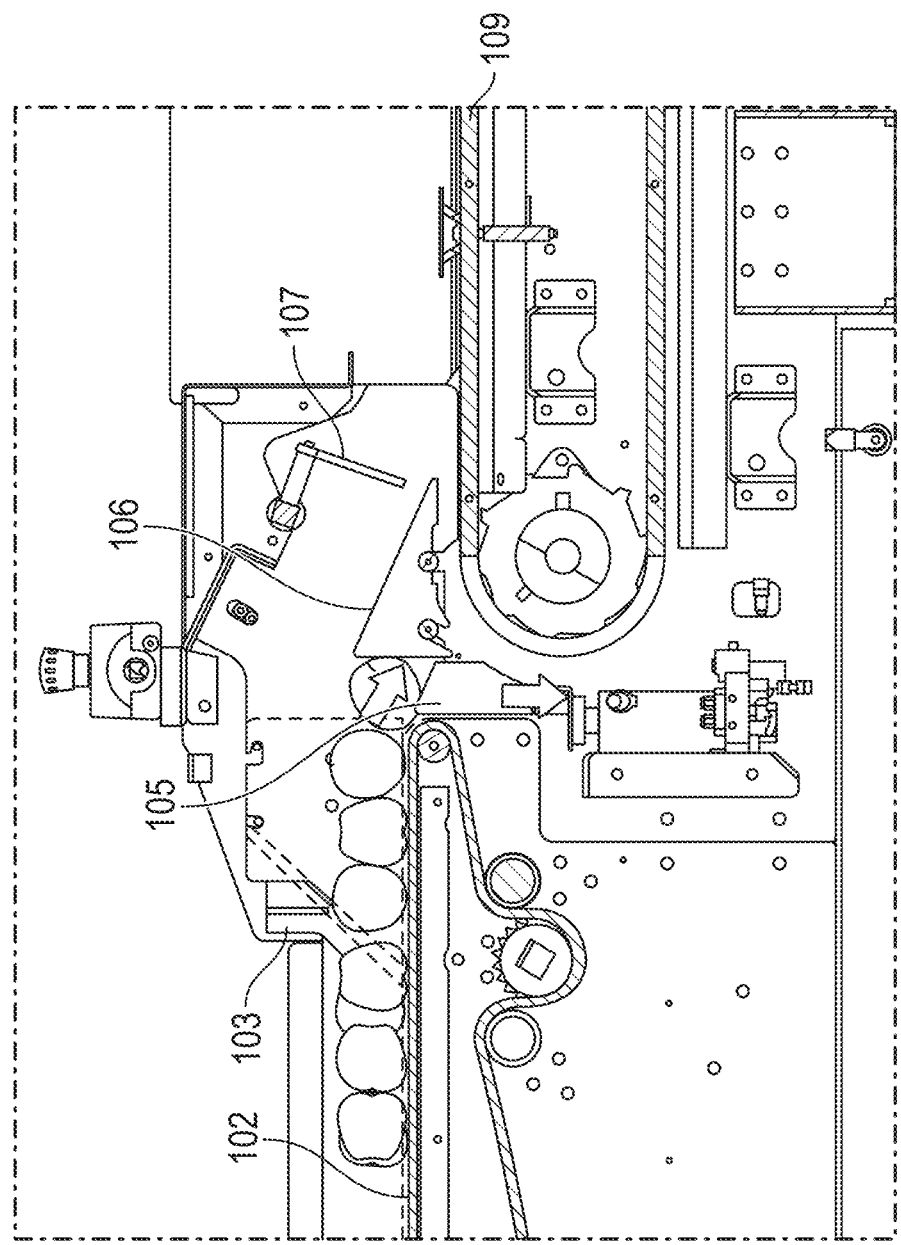

Once an item of produce contacts or is adjacent the stop-block 105, the stop-block 105 is lowered to receive the item of produce on an upper surface thereof, as shown in FIG. 18.

Figure 19:
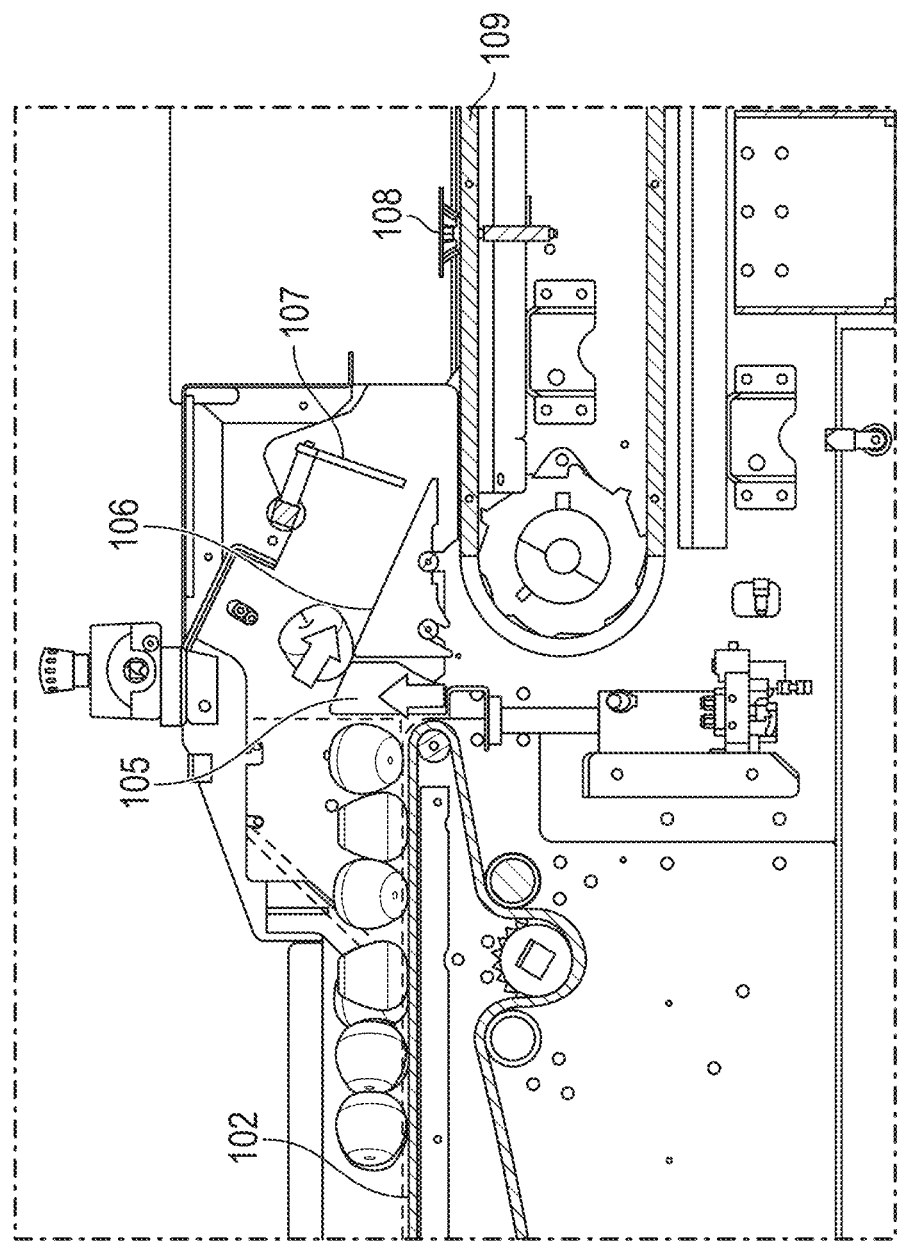

The stop-block is then raised to lift the item of produce above a ramp surface 106 on a downstream side of the stop-bock 105, as shown in FIG. 19.

Figure 20:
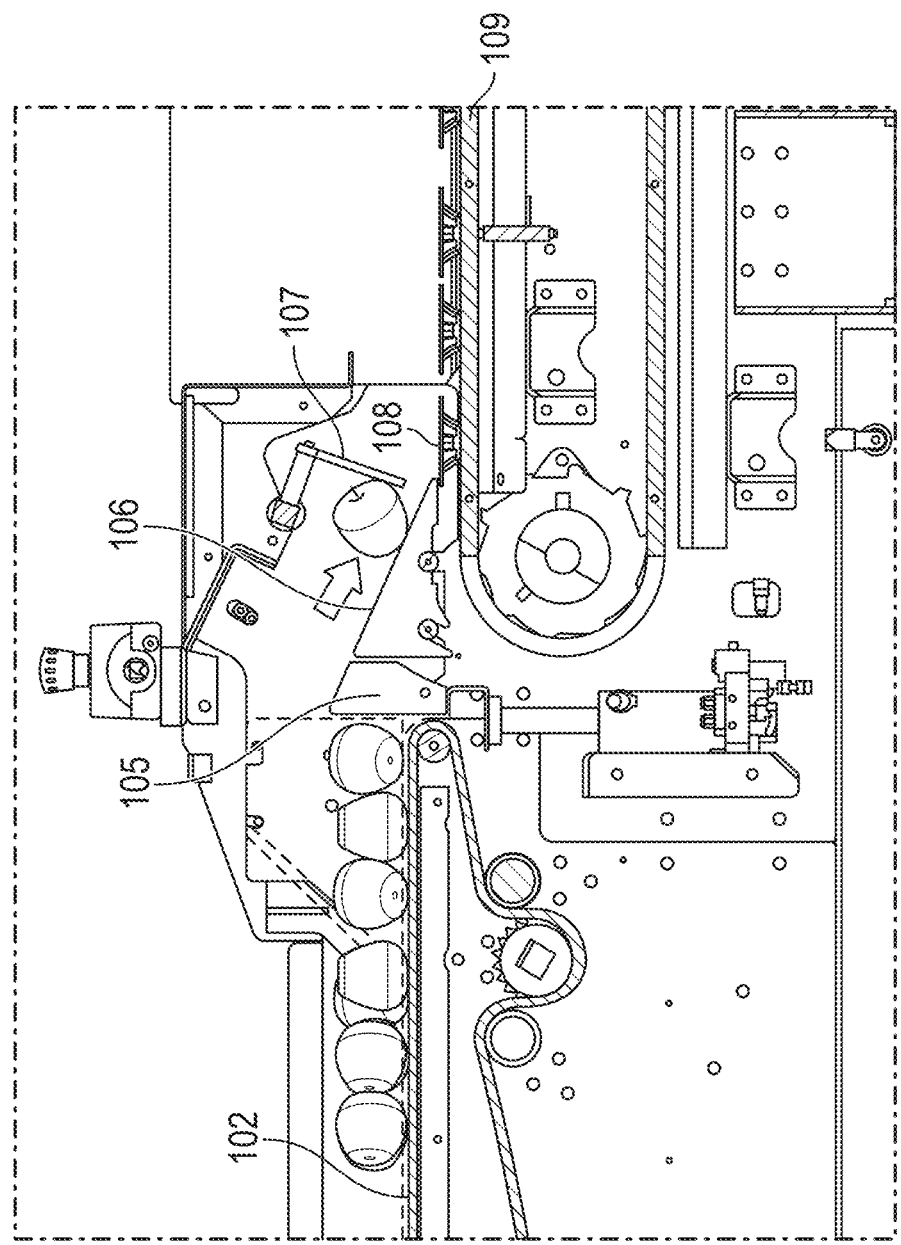
Figure 21:
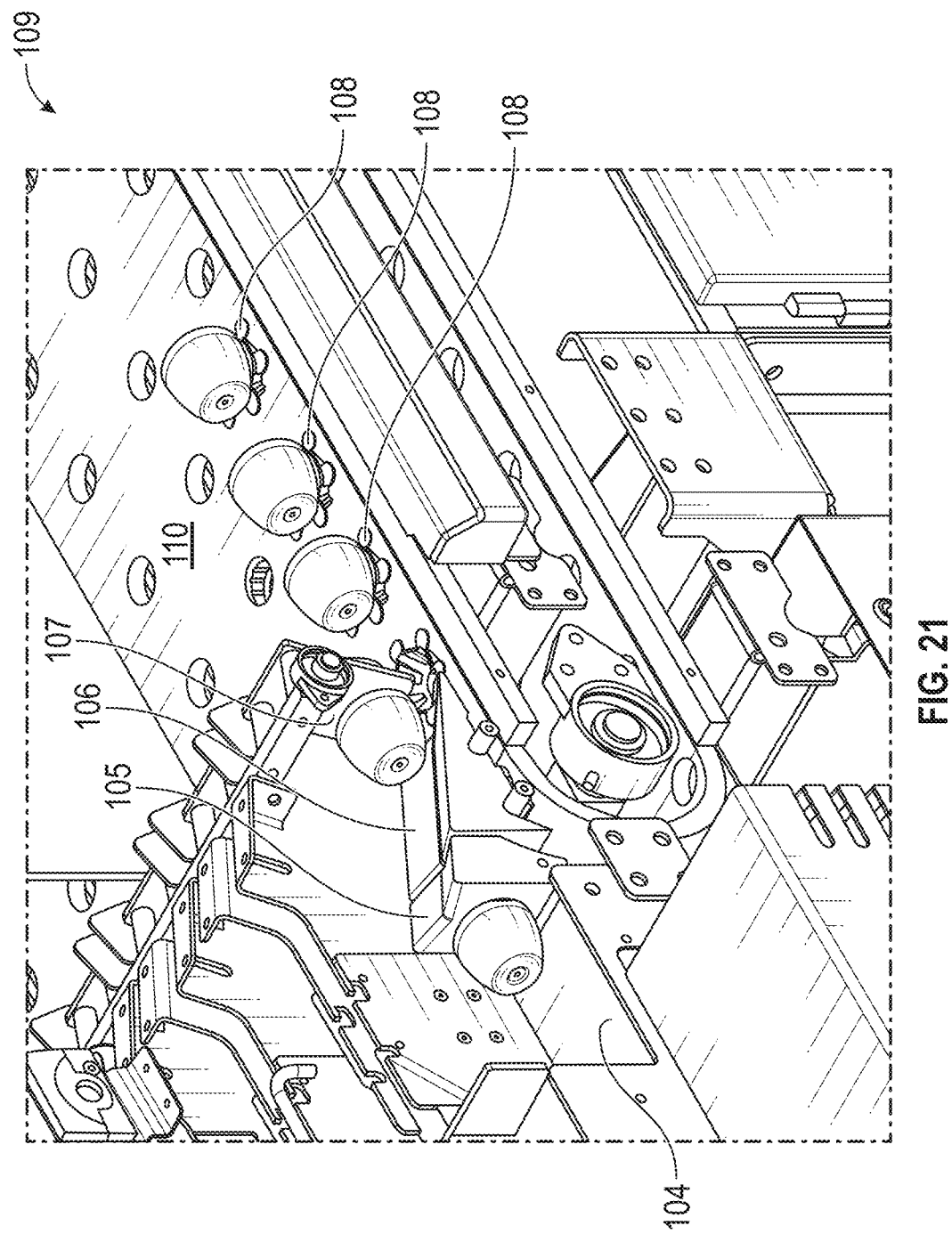

The upper surface of the stop-block 105 is sloped downwards towards the down-stream ramp surface 106 so that when in the raised position the individual item of produce moves down the stop block and ramp surface to be received on a retaining component or holder 108, as shown in FIGS. 20 and 21.

In the illustrated embodiment the separating device includes a stop flap 107. The flap 107 contacts the item of produce as it moves down the ramp surface 106 so that the item of produce is received in the holder 108 in a controlled manner.

The flap 108 remains in a stationary or initial position prior to contacting an item of produce, for example as shown in FIG. 19. As the item of produce moves down the ramp surface 106 the produce contacts the flap 107 as shown in FIGS. 20 and 21 and moves the flap away from the stationary or initial position to allow the produce to continue to move down the ramp and onto the holder 108. The flap may be flexible and or may be moveably mounted, for example on a pivot. Preferably the flap is biased to the stationary or initial position and provides a light contact on the produce to prevent damage to the produce. Other arrangements may be provided to separate or singulate the produce into one or more spaced apart columns or rows.

In the illustrated embodiment, the singulation unit 101 further comprises a singulated conveyor 109. The singulated conveyor comprises a continuous conveyor loop or belt 110 (refer FIG. 21) carrying the holders 108.

The holders 108 are spaced apart in a conveying direction along the conveyor belt 110. In the illustrated embodiment the singulated conveyor comprises holders 108 spaced apart in the conveying direction along the conveyor belt 110 and orthogonal to the conveying direction across the conveyor belt to be spaced apart in two dimensions to present the items of produce to the robot positioning apparatus and end effector in a 2-dimensional array.

Each holder holds a single individual item of produce and represents a position on the conveyor (or in the 2-dimensional array). In FIG. 21 only a small number of holders 108 are shown, however one skilled in the art will understand that the illustrated singulated conveyor will have many more holders located at positions identified in FIG. 15 by holes in the singulated conveyor.

Once items of produce are received in respective holders the produce is singulated and ready to be picked up by the robot positioning apparatus 3 to be received in a tube carried by the end effector 1 as described above.

The produce is sufficiently spaced apart so that the end effector 1 can be lowered over an individual item of produce without contacting adjacent items of produce.

The robot positioning apparatus 3 is controlled to position the end effector 1 in an inverted position vertically above an item of produce and move in a conveying direction (y) at a speed of the conveyor so that the end effector 1 remains vertically above the item of produce as the robot positioning apparatus 3 moves the end effector 1 vertically downwards over the item of produce to receive the item of produce in the end effector 1.

Once received in the end effector 1 the robot positioning apparatus 3 lifts the item of fruit from the holder 108 while still moving in the conveying direction at the speed of the conveyor 109. Once received in the end effector and lifted from the holder the robot positioning apparatus 3 is controlled to move to position the end effector 1 over a next item of produce to be packaged and the vertical movement downwards and then upwards while simultaneously moving in the conveying direction is repeated.

In a packing operation items of produce may not be packaged before reaching an end of the singulation conveyor 109. Any items of produce reaching an end of the conveyor may be collected and returned to the infeed conveyor 102 to be singulated again for packing. Items of produce may be collected in a container and returned to the infeed conveyor, for example by a person.

Figure 22:
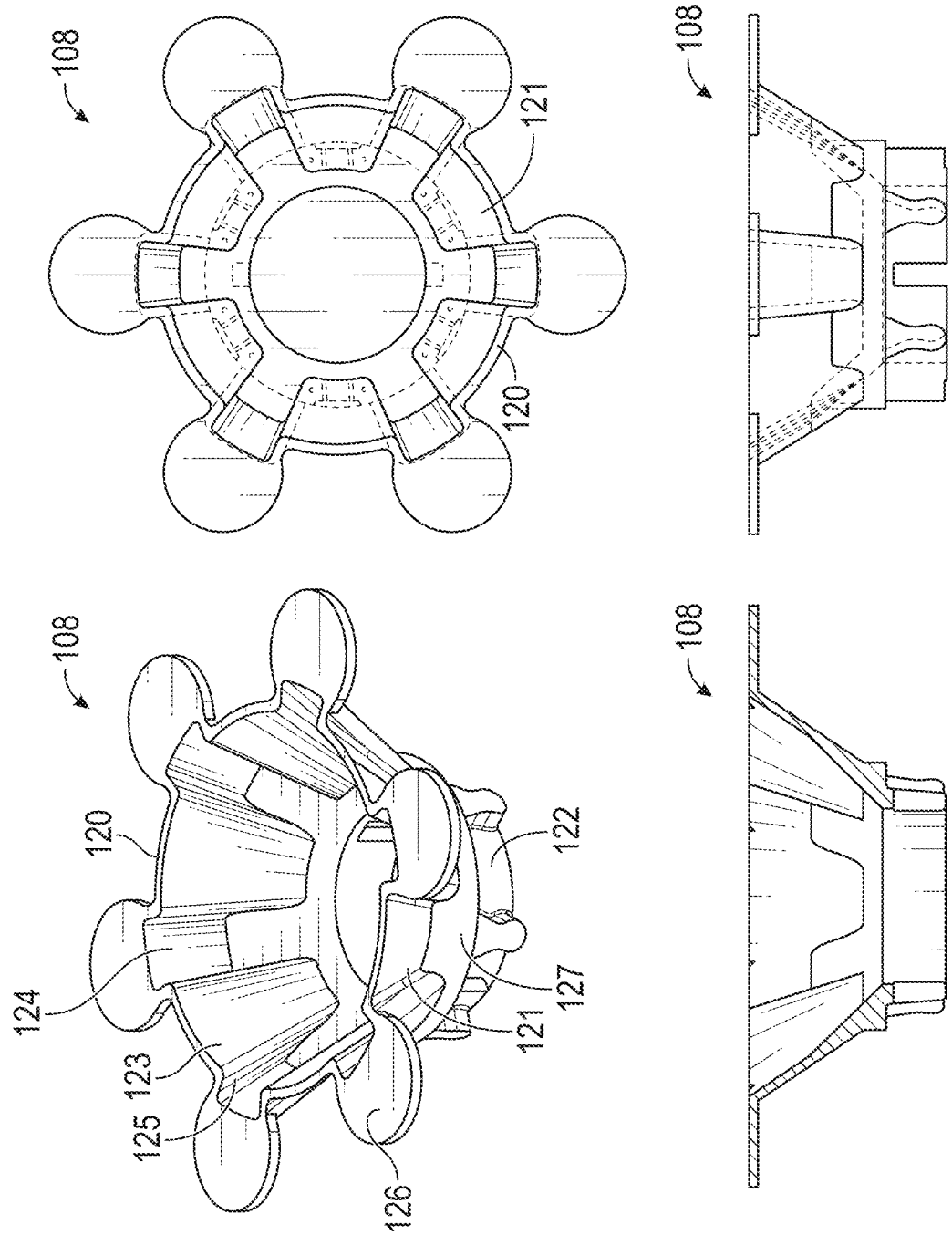
FIG. 22 shows a perspective view, top view, side view and a cross sectional view of a holder for holding an individual item of produce in accordance with a preferred embodiment of a further aspect of the present invention.

FIG. 22 illustrates one embodiment of a holder 108. The holder 108 is formed from a soft resilient material so that an item of produce is received on the holder 108 without being damaged. The resilient material may be a silicone rubber or other suitable resilient material. The holder is a unitary member (single part), for example a unitary moulded member.

The holder 108 is configured as a cup presenting an upper rim 120 on which a single item of produce sits. In the illustrated embodiment the cup comprises a side wall 121 extending from a base 122, and an upper end of the wall presents the rim 120 for receiving the item of produce. The item of produce may contact the rim or an inner surface on an upper region of the wall 121. The base 122 is attached to the continuous conveyor 110.

In the illustrated embodiment the wall 121 is frustoconical however other shapes are possible, such as cylindrical. The wall 121 is castellated to have inner wall portions 123 and outer wall portions 124. This form presents webs 125 between the inner and outer wall portions and therefore a longer wall for a given produce size to aid in providing a soft and resilient cushion for receiving an item of produce. The illustrated embodiment also has tabs 126 extending radially outwards from the rim 120. The tabs 126 also aid in providing a soft and resilient cushion for receiving an item of produce.

The holder 108 also has an outwardly projecting circumferential flange 127 where the walls 121 and base 122 intersect which helps support produce within the holder.

As shown in FIGS. 8 and 11, when the end effector 1 is moved downwards to receive the item of produce in the tube, an end of the end effector 1 contacts the tabs 126. This contact may define an elevation at which the actuatable element 7 is moved to the retracted position.

The holder 108 is configured so that the item of produce sits high enough on the holder 108 so that the item of produce is received within the end effector 1 with a widest perimeter portion of the item of produce below the actuatable element 7 so that when the actuatable element 7 is moved to the retracted (closed) position the item of produce is captured within the tube 2 above the actuatable element 7.

As mentioned above, to help ensure the produce is not bruised or otherwise damaged during the packaging operation the holder 108 is made out of a resilient soft material.

Preferably, the holder 108 may be made out of a polyhydroxy-butyrate-co-valerate (PHBV) biopolymer such as manufactured and sold by TianAn Biologic Materials Co., Ltd under the trade mark ENMAT. The PHBV biopolymer being bio-based and biodegradable.

The packaging device 100 comprises a sensor arrangement 111 (FIG. 15) to sense or detect each item of produce in the singulated items of produce. The device 100 also comprises a controller with a memory in communication with the sensor arrangement and the controller is configured to store in the memory a data point for each item of produce associated with a respective holder 108 holding the item of produce.

In a preferred embodiment the singulation unit 101 presents items of produce in a 2-dimensional array and the controller stores in the memory a datapoint for each position in the 2-dimensional array. Each position may be represented by an x, y coordinate. The x, y coordinate may be tracked or updated by the controller as the conveyor moves the singulated produce in a conveying direction.

The robot positioning device 3 moves the end effector 1 to be overhead a holder 108 to collect the item of produce based on the datapoint for the item of produce associated with the holder.

The datapoint may be a binary indicator to indicate that an item of produce is present or not present on the holder 108. If the datapoint indicates an item of produce is present the controller controls the robot positioning apparatus 3 to move the end effector 1 to the holder 108 to pick up the item of produce.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What we claim is:

1. An end effector to be carried by a robot positioning apparatus for packing individual items of produce in a stacked manner of packaging, wherein:
    the end effector is adapted to releasably hold a tube in an inverted orientation, wherein the tube has a closed bottom end and an open top end such that the open end is available to receive items of produce therein;
    the end effector including:
    at least one actuatable movable element located on the end effector so as to be adjacent the open end of the tube held by the end effector;
    wherein the actuatable movable element is configured to be operable between:
        i) an extended position which at least partially extends over the open end of a tube held by the end effector to at least partially obstruct the open end of the tube for retaining items of produce therein; and
        ii) a retracted position so that the open end of the tube is unobstructed to allow items of produce to be received in the tube;
    wherein the tube itself is the final end-use packaging for housing the items of produce.

2. The end effector as claimed in claim 1, wherein the end effector comprises a frame for receiving the tube.

3. The end effector as claimed in claim 2, wherein the actuatable moveable element is located adjacent to one end of the frame.

4. The end effector as claimed in claim 1, wherein the actuatable movable element is made from a soft resilient material and is elastically deformable between a first shape, when in the extended position, and a second shape, when in the retracted position.

5. The end effector as claimed in claim 4, wherein the first shape is circular.

6. The end effector as claimed in claim 4, wherein the second shape is non-circular or oval.

7. The end effector as claimed in claim 1, wherein the actuatable movable element is ring shaped or has a ring-shaped central portion.

8. The end effector as claimed in claim 7, wherein the actuatable movable element comprises a first part and a second part;
    the first and second parts each comprising an arcuate portion and a lateral member extending from each end of the arcuate portion;
    wherein the first and second parts are diametrically opposed, with the lateral members of the first part in contact with or adjacent the lateral members of the second part.

9. The end effector as claimed in claim 8, wherein when the actuatable movable element is in the retracted position, a gap is provided between a radially inward portion of the lateral members of the first and second parts, and wherein when the actuatable movable element is in the extended position, the arcuate portions are elastically deformed and the radially inward portion of the lateral members of the first and second parts are moved together to close the gap.

10. The end effector as claimed in claim 1, wherein the end effector includes:
    a holding arrangement configured to:
    grip the tube and secure the tube to the end effector; and
    wherein the holding arrangement grips the tube adjacent the closed bottom end of the tube.

11. A produce packing device comprising a robot positioning apparatus and an end effector as claimed in claim 1, wherein the robot positioning apparatus provides at least four degrees of freedom to move the end effector along x, y and z axes with respect to items of produce to be packaged and rotate the end effector about a horizontal axis between inverted and up-right orientations.

12. An end effector to be carried by a robot positioning apparatus for packing individual items of produce in a stacked manner of packaging, wherein the end effector is adapted to releasably hold a tube in an inverted orientation, wherein the tube has a closed bottom end and an open top end such that the open end is available to receive items of produce therein;
    the end effector including:
    at least one actuatable movable element located on the end effector so as to be adjacent the open end of the tube held by the end effector;
    wherein the actuatable movable element is configured to be operable between:
        i) an extended position which at least partially extends over the open end of a tube held by the end effector to at least partially obstruct the open end of the tube for retaining of produce therein; and
        ii) a retracted position so that the open end of the tube is unobstructed to allow items of produce to be received in the tube;
    wherein the tube itself is the final end-use packaging for housing the items of produce,
    wherein the end effector includes:
    a holding arrangement configured to:
    grip the tube and secure the tube to the end effector; and
    wherein the holding arrangement grips the tube adjacent the closed bottom end of the tube,
    wherein the holding arrangement comprises an at least one movable component, wherein the at least one component is movable between a disengaged position and an engaged position;
    wherein when the at least one component is in the disengaged position, the component(s) is/are out of contact with the tube; and
    wherein when the at least one component is in the engaged position, the movable component(s) is/are in contact with the tube to squeeze and deform the tube.

13. An end effector to be carried by a robot positioning apparatus for packing individual items of produce in a stacked manner of packaging, wherein the end effector is adapted to releasably hold a tube in an inverted orientation, wherein the tube has a closed bottom end and an open top end such that the open end is available to receive items of produce therein;
    the end effector including:
    at least one actuatable movable element located on the end effector so as to be adjacent the open end of the tube held by the end effector;
    wherein the actuatable movable element is configured to be operable between:
        i) an extended position which at least partially extends over the open end of a tube held by the end effector to at least partially obstruct the open end of the tube for retaining items of produce therein; and ii) a retracted position so that the open end of the tube is unobstructed to allow items of produce to be received in the tube;

wherein the tube itself is the final end-use packaging for housing the items of produce, further comprising a produce packaging device, wherein the robot positioning apparatus provides at least four degrees of freedom to move the end effector along x, y and z axes with respect to items of produce to be packaged and rotate the end effector about a horizontal axis between inverted and up-right orientations;

wherein the produce packing device further comprises a controller programmed to:

i) control the robot positioning apparatus to position the end effector in an inverted orientation in x and y directions vertically above a first item of produce to be packaged, wherein the end effector is moved vertically downwards to receive the first item of produce in the tube within the end effector;

ii) actuate the actuatable movable element from the retracted position to the extended position to receive a first item of produce in the tube, wherein once the first item of produce is within the tube, the actuatable moveable element is further actuated to the retracted position to retain the first item of fruit within the tube; and iii) control the robot positioning apparatus to move the end effector vertically upwards.

14. The produce packing device as claimed in claim 13, wherein the controller is further programmed to:

iv) control the robot positioning apparatus to move the end effector in the x and y directions to position the end effector vertically above a further item of fruit, and move the end effector vertically downwards to position a newly introduced third item of fruit adjacent or in contact with the further item of fruit;

v) actuate the actuatable movable element from the retracted position to the extended position;

vi) control the positioning apparatus to continue to move the end effector vertically downwards to receive the further item of produce in the tube within the end effector;

vii) actuate the actuatable movable element from the retracted position to the extended position to retain the first item of fruit and the further item of fruit in the tube; and viii) control the robot positioning apparatus to move the end effector vertically upwards; and ix) repeat any one of, any combination of, or all of, steps (i) to (v) until the tube is full.

15. The produce packing device as claimed in claim 14, wherein the controller is further programmed to:

x) when the tube is full control the robot positioning apparatus to rotate the end effector once the tube is full, from the inverted orientation to an upright orientation to position an open end of the tube uppermost, and to move the end effector to a release area so as to release the tube from the end effector.

16. The produce packing device as claimed in claim 15, wherein the controller is further programmed to control the robot positioning apparatus to move the end effector vertically upwards so as to release the tube from the end effector.

17. The produce packing device as claimed in claim 13, wherein the controller is further programmed to actuate the holding arrangement to an engaged position to grip and deform the cross-sectional shape of the tube near to a closed end of the tube so that the first item of produce is obstructed from entering a space at the closed end of the tube.

18. The produce packing device as claimed in claim 17, wherein the controller is further programmed to:

control the robot positioning apparatus to rotate the end effector from the inverted orientation to an upright orientation to position an open end of the tube uppermost, and move the end effector to a release area; and actuate the holding arrangement to a disengaged position to release the tube.

19. The produce packing device as claimed in claim 13, wherein the produce packing device comprises a singulation unit to space apart the items of produce and present singular items, or grouped items, of product to a reach envelope of the robot positioning apparatus.

20. The produce packing device as claimed in claim 19, wherein the singulation unit spaces the items and/or groups of produce apart in a 2-dimensional array.

21. The produce packing device as claimed in claim 19, wherein the singulation unit comprises a conveyor configured to present the items/groups of produce in a manner which conforms with the reach envelope of the robot positioning apparatus.

22. The produce packing device as claimed in claim 21, wherein the controller is programmed to control the robot positioning apparatus to move the end effector vertically above an item of produce and move in a conveying direction at a speed of the conveyor so that the end effector remains vertically above the item of produce.

23. The produce packing device as claimed in claim 21, wherein the conveyor comprises a continuous loop carrying a plurality of spaced apart holders, wherein each holder is adapted to hold an individual item of produce.

24. The produce packing device as claimed in claim 23, wherein the plurality of spaced apart holders are spaced apart in a conveying direction and orthogonal to the conveying direction to present the items of produce in a 2-dimensional array.

25. The produce packing device as claimed in claim 23, wherein the produce packing device further comprises a sensing arrangement in communication with the controller to sense or detect a datapoint for each item of produce, wherein the controller is programmed to:

i) store in a memory a datapoint for each item of produce associated with a respective holder of the singulation unit holding the item of produce; and ii) control the robot positioning apparatus and end effector to pack each item of produce based on the datapoint for each item of produce.

26. The produce packing device as claimed in claim 23, wherein the plurality of spaced apart holders are formed from a resilient soft material.

27. The produce packing device as claimed in claim 23, wherein at least one of the plurality of spaced apart holders are configured as a holder comprising a side wall extending from a base, wherein an upper end of the wall presents a rim for receiving an item of produce.

28. The produce packing device as claimed in claim 27, wherein the wall is castellated to have inner wall portions and outer wall portions.

29. The produce packing device as claimed in claim 27, wherein the holder comprises tabs extending radially outwards from and spaced apart around the rim, and wherein when the end effector is moved downwards to receive an item of fruit in the tube, an end of the end effector contacts the tabs.

30. The produce packing device as claimed in claim 23, wherein each holder is a unitary member.

31. An automated method of packing items of produce using an end effector to be carried by a robot positioning apparatus for packing individual items of produce in a stacked manner of packaging, wherein the end effector is adapted to releasably hold a tube in an inverted orientation, wherein the tube has a closed bottom end and an open top end such that the open end is available to receive items of produce therein;
- the end effector including:
- at least one actuatable movable element located on the end effector so as to be adjacent the open end of the tube held by the end effector;
- wherein the actuatable movable element is configured to be operable between:
  - i) an extended position which at least partially extends over the open end of a tube held by the end effector to at least partially obstruct the open end of the tube for retaining items of produce therein; and
  - ii) a retracted position so that the open end of the tube is unobstructed to allow items of produce to be received in the tube;
- wherein the tube itself is the final end-use packaging for housing the items of produce, said method comprising:
- conveying items of produce on a plurality of spaced apart holders with an upper rim on which the single item of produce sits; and
- using the tube of the end effector to pick up items of produce from the spaced apart holders for packaging therein.

* * * * *